US011961283B2

(12) United States Patent
Pappas et al.

(10) Patent No.: US 11,961,283 B2
(45) Date of Patent: Apr. 16, 2024

(54) MODEL-BASED ROBUST DEEP LEARNING

(71) Applicant: The Trustees of the University of Pennsylvania, Philadelphia, PA (US)

(72) Inventors: George J. Pappas, Philadelphia, PA (US); Hamed Hassani, Philadelphia, PA (US); Alexander Robey, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 512 days.

(21) Appl. No.: 17/337,972

(22) Filed: Jun. 3, 2021

(65) Prior Publication Data

US 2022/0101627 A1 Mar. 31, 2022

Related U.S. Application Data

(60) Provisional application No. 63/034,355, filed on Jun. 3, 2020.

(51) Int. Cl.
| | |
|---|---|
| *G06V 10/77* | (2022.01) |
| *G06N 3/045* | (2023.01) |
| *G06V 10/72* | (2022.01) |
| *G06V 10/774* | (2022.01) |

(52) U.S. Cl.
CPC ......... *G06V 10/7747* (2022.01); *G06N 3/045* (2023.01); *G06V 10/72* (2022.01)

(58) Field of Classification Search
CPC .... G06V 10/7747; G06V 10/72; G06V 10/82; G06V 20/582; G06V 20/63; G06N 3/045; G06N 3/08
See application file for complete search history.

(56) References Cited

U.S. PATENT DOCUMENTS

| | | | | |
|---|---|---|---|---|
| 7,848,548 B1* | 12/2010 | Moon | ................... | G06V 10/75 |
| | | | | 382/118 |
| 2018/0082172 A1* | 3/2018 | Patel | ..................... | G06N 3/047 |
| 2022/0326663 A1* | 10/2022 | Van Roy | .............. | G05B 13/027 |

OTHER PUBLICATIONS

Robey A, Hassani H, Pappas GJ. Model-based robust deep learning: Generalizing to natural, out-of-distribution data. arXiv preprint arXiv:2005.10247. May 20, 2020. (Year: 2020).*

Fawzi A, Frossard P. Measuring the effect of nuisance variables on classifiers. InProceedings of the British Machine Vision Conference (BMVC) 2016 (pp. 137-1). (Year: 2016).*

Xie S, Hu H. Facial expression recognition using hierarchical features with deep comprehensive multipatches aggregation convolutional neural networks. IEEE Transactions on Multimedia. Jun. 4, 2018;21(1):211-20. (Year: 2018).*

(Continued)

*Primary Examiner* — Fayyaz Alam
(74) *Attorney, Agent, or Firm* — Jenkins, Taylor & Hunt, P.A.

(57) ABSTRACT

Methods, systems, and computer readable media for model-based robust deep learning. In some examples, a method includes obtaining a model of natural variation for a machine learning task. The model of natural variation includes a mapping that specifies how an input datum can be naturally varied by a nuisance parameter. The method includes training, using the model of natural variation and training data for the machine learning task, a neural network to complete the machine learning task such that the neural network is robust to natural variation specified by the model of natural variation.

21 Claims, 8 Drawing Sheets

(56) References Cited

OTHER PUBLICATIONS

Fazlyab et al., "Safety Verification and Robustness Anaylsis of Neural Networks via Quadratic Constraints and Semidefinite Programming," arXiv:1903.01287v3, pp. 1-16 (Sep. 15, 2021).
Hendrycks et al., "Natural Adversarial Examples," arXiv:1907.07174v4, pp. 1-16 (Mar. 4, 2021).
Wallace et al., "Imitation Attacks and Defenses for Black-box Machine Translation Systems," arXiv:2004.15015v3, pp. 1-16 (Jan. 3, 2021).
Kamath et al., "Invariance vs. Robustness of Neural Networks," ICLR 2020 Conference Blind Submission, pp. 1-21 (2020).
Jacobsen et al., "Excessive Invariance Causes Adversarial Vulnerability," arXiv:1811.00401v4, pp. 1-17 (Jul. 12, 2020).
Jain et al., "Generating Semantic Adversarial Examples with Differentiable Rendering," ICLR, pp. 1-14 (2020).
Raghunathan et al., "Certified Defenses Against Adversarial Examples," arXiv:1801.09344v2, pp. 1-15 (Oct. 31, 2020).
Tramer et al., "On Adaptive Attacks to Adversarial Example Defenses," arXiv:2002.08347v2, pp. 1-44 (Oct. 23, 2020).
Temel et al., "Traffic Sign Detection Under Challenging Conditions: A Deeper Look into Performance Variations and Spectral Characteristics," IEEE Transactions on Intelligent Transportation Systems, vol. 21, No. 9, pp. 1-11 (Sep. 2020).
Oakden-Rayner et al., "Hidden Stratification Causes Clinically Meaningful Failures in Machine Learning for Medical Imaging," ACM CHIL '20, pp. 1-9 (Apr. 2-4, 2020).
Wu et al., "Making an Invisibility Cloak: Real World Adversarial Attacks on Object Detectors," arXiv:1910.14667v2, pp. 1-16 (Jul. 22, 2020).
Yadav et al., "Cold Case: the Lost MNIST Digits," arXiv:1905.10498v2, pp. 1-13 (Nov. 4, 2019).
Su et al., "One Pixel Attack for Fooling Deep Neural Networks," IEEE Transactions on Evolutionary Computation, vol. 23, No. 5, pp. 828-841 (Oct. 2019).
Madry et al., "Towards Deep Learning Models Resistant to Adversarial Attacks," arXiv:1706.06083v4, pp. 1-28 (Sep. 4, 2019).
Arruda et al., "Cross-Domain Car Detection Using Unsupervised Image-to-Image Translation: From Day to Night," IJCNN 2019. International Joint Conference on Neural Networks, pp. 1-8 (Jul. 14-19, 2019).
Jalal et al., "The Robust Manifold Defense: Adversarial Training using Generative Models," arXiv:1712.09196v5, pp. 1-19 (Jul. 10, 2019).
Balunovic et al., "Certifying Geometric Robustness of Neural Networks," 33rd Conference on Neural Information Processing Systems pp. 1-13 (2019).
Zhang et al., "Theoretically Principled Trade-off between Robutness and Accuracy," arXiv:1901.08573v3, pp. 1-31 (Jun. 24, 2019).
Brock et al., "Large Scale GAN Training for High Fidelity Natural Image Synthesis," arXiv:1809.11096v2, pp. 1-35 (Feb. 25, 2019).
Chernikova et al., , "Are Self-Driving Cars Secure? Evasion Attacks against Deep Neural Networks for Steering Angle Prediction," 2019 IEEE Security and Privacy Workshops, pp. 1-6 (2019).
Cohen et al., "Certified Adversarial Robustness via Randomized Smoothing," arXiv:1902.02918v2 pp. 1-36 (Jun. 15, 2019).
Cohen et al., "Gauge Equivariant Convolutional Networks and the Icosahedral CNN," arXiv:1902.04615v3, pp. 1-15 (May 13, 2019).
Devin et al., "BERT: Pre-training of Deep Bidirectional Transformers for Language Understanding," arXiv:1810.04805v2, pp. 1-16 (May 24, 2019).
Dreossi et al., "Compositional Falsification of Cyber-Physical Systems with Machine Learning Components," Journal of Automated Reasoning, vol. 63, pp. 1-23 (2019).
Engstrom et al., "Exploring the Landscape of Spatial Robustness," arXiv:1712.02779v4, pp. 1-23 (Sep. 16, 2019).
Esteva et al., "A guide to deep learning in healthcare," Nature Medicine, vol. 2s, pp. 24-29 (Jan. 2019).
Fazlyab et al., "Efficient and Accurate Estimation of Lipschitz Constants for Deep Neural Networks," arXiv:1906.04893v1, pp. 1-16 (Jun. 12, 2019).
Li et al., "REPAIR: Removing Representation Bias by Dataset Resampling," arXiv:1904.07911v1, pp. 1-10 (Apr. 16, 2019).
Hendrycks et al., "Benchmarking Neural Network Robustness to Common Corruptions and Perturbations," arXiv:1903.12261v1, pp. 1-16 (Mar. 28, 2019).
Madaan et al., "Adversarial Neural Pruning," ICLR 2020, pp. 1-18 (2019).
Naseer et al., "Cross-Domain Transferability of Adversarial Perturbations," arXiv:1905.11736v5, pp. 1-20 (Oct. 14, 2019).
Wang et al., "A Direct Approach to Robust Deep Learning Using Adversarial Networks," arXiv:1905.09591v1, pp. 1-15 (May 23, 2019).
Shankar et al., "A systematic framework for natural perturbations from videos," arXiv:1906.02168, pp. 1-13 (2019).
Wang et al., "AT-GAN: A Generative Attack Model for Adversarial Transferring on Generative Adversarial Net," arXiv:1904.07793v3, pp. 1-16 (May 21, 2019).
Vandenhende et al., "A Three-Player GAN: Generating Hard Samples to Improve Classification Networks," 16th International Conference on Machine Vision Applications (MVA) National Olympics Memorial Youth Center, pp. 1-6 (May 27-31, 2019).
Xiao et al., "Generating Adversarial Examples with Adversarial Networks," arXiv:1801.02610v5, pp. 1-8 (Feb. 14, 2019).
Wu et al. "Delving into Robust Object Detection from Unmanned Aerial Vehicles: A Deep Nuisance Disentanglement Approach," 2019 IEEE/CVF International Conference on Computer Vision (ICCV), pp. 1-10 (2019).
Dreossi et al., "Computer Aided Verification," 30th International Conference, CAV, pp. 1-709 (2018).
Eykholt et al., "Robust Physical-World Attacks on Deep Learning Visual Classification," 2018 IEEE/CVF Conference on Computer Vision and Pattern Recognition, pp. 1-10 (2018).
Schott et al., "Towards the First Adversarially Robust Neural Network Model on MNIST," arXiv:1805.09190v3, pp. 1-16 (Sep. 20, 2018).
Papangelou et al., "Toward an Understanding of Adversarial Examples in Clinical Trials," ECML PKDD 2018, pp. 35-51 (2019).
Zhu et al., "Toward Multimodal Image-to-Image Translation," arXiv:1711.11586v4, pp. 1-12 (Oct. 24, 2018).
Yi et al., "DualGAN: Unsupervised Dual Learning for Image-to-Image Translation," arXiv:1704.02510v4, pp. 1-17 (Oct. 9, 2018).
Wong et al., "Provable Defenses against Adversarial Examples via the Convex Outer Adversarial Polytope," arXiv:1711.00851v3, pp. 1-19 (Jun. 8, 2018).
Dumont et al., "Robustness of Rotation-Equivariant Networks to Adversarial Perturbations," arXiv:1802.06627v2, pp. 1-6 (May 17, 2018).
Athalye et al., "Obfuscated Gradients Give a False Sense of Security: Circumventing Defenses to Adversarial Examples," arXiv:1802.00420v4, pp. 1-12 (Jul. 31, 2018).
Almahairi et al., "Augmented CycleGAN: Learning Many-to-Many Mappings from Unpaired Data," arXiv:1802.10151v2, pp. 1-10 (Jun. 18, 2018).
Clanuwat et al., "Deep Learning for Classical Japanese Literature," arXiv:1812.01718v1, pp. 1-8 (Dec. 3, 2018).
Athalye et al., "Synthesizing Robust Adversarial Examples," arXiv:1707.07397v3, pp. 1-19 (Jun. 7, 2018).
Wei et al., "Sparse Adversarial Perturbations for Videos," arXiv:1803.02536v1, pp. 1-7 (Mar. 7, 2018).
Dong et al., "Boosting Adversarial Attacks with Momentum," arXiv:1710.06081v3, pp. 1-12 (Mar. 22, 2018).
Guo et al., "Countering Adversarial Images Using Input Transformations," arXiv:1711.00117v3, pp. 1-12 (Jan. 25, 2018).
Prakash et al., "Deflecting Adversarial Attacks with Pixel Deflection," 2018 IEEE/CVF Conference on Computer Vision and Pattern Recognition, pp. 1-10 (2018).
Samangouei et al., "Defense-GAN: Protecting Classifiers Against Adversarial Attacks Using Generative Models," ICLR 2018, pp. 1-17 (2018).

(56) References Cited

OTHER PUBLICATIONS

Volpi et al., "Generalizing to Unseen Domains via Adversarial Data Augmentation," 32nd Conference on Neural Information Processing Systems (NeurIPS 2018), pp. 1-12 (2018).
Zhao et al., "Generating Natural Adversarial Examples," arXiv:1710.11342v2, pp. 1-15 (Feb. 23, 2018).
Esteves et al., "Polar Transfomer Networks," arXiv: 1709.01889v3, pp. 1-14 (Feb. 1, 2018).
Xiao et al., "Spatially Transformed Adversarial Examples," arXiv:1801.02612v2, pp. 1-29 (Jan. 9, 2018).
Zhong et al., "Random Erasing Data Augmentation," arXiv:1708.04896v2, pp. 1-10 (Nov. 16, 2017).
Carlini et al. "Adversarial Examples Are Not Easily Detected: Bypassing Ten Detection Methods," Session: Deep Learning, AISec'17, pp. 1-12 (Nov. 3, 2017).
Cohen et al., "EMNIST: extending MNIST to handwritten letters," IEEE, pp. 1-6 (2017).
Kanbak et al., "Geometric robustness of deep networks: analysis and improvement," arXiv:1711.09115v1, pp. 1-9 (Nov. 24, 2017).
Liu et al., "Unsupervised Image-to-Image Translation Networks," 31st Conference on Neural Information Processing Systems (NIPS 2017), pp. 1-10 (2017).
Meng et al., "MagNet: a Two-Pronged Defense against Adversarial Examples," arXiv:1705.09064v2, pp. 1-13 (Sep. 11, 2017).
Lee et al., "Generative Adversarial Trainer: Defense to Adversarial Perturbations with GAN," arXiv:1705.03387v2, pp. 1-9 (May 26, 2017).
Cisse et al., "Parseval Networks: Improving Robustness to Adversarial Examples," arXiv:1704.08847v2, pp. 1-10 (May 2, 2017).
Melis et al., "Is Deep Learning Safe for Robot Vision? Adversarial Examples against the iCub Humanoid," 2017 IEEE International Conference on Computer Vision Workshops, pp. 1-12 (2017).
Xiao et al., "Fashion-MNIST: a Novel Image Dataset for Benchmarking Machine Learning Algorithms," arXiv:1708.07747v2, pp. 1-6 (Sep. 15, 2017).
Kingma et al., "ADAM: A Method for Stochastic Optimization," arXiv:1412.6980v9, pp. 1-15 (Jan. 30, 2017).
Kurakin et al., "Adversarial Examples in the Physical World," arXiv:1607.02533v4, pp. 1-14 (Feb. 11, 2017).
Pei et al., "DeepXplore: Automated Whitebox Testing of Deep Learning Systems," SOSP'17, pp. 1-18 (Oct. 28, 2017).
Sabour et al., "Dynamic Routing Between Capsules," 31st Conference on Neural Information Processing Systems (NIPS), pp. 1-13 (2017).
Worrall et al., "Harmonic Networks: Deep Translation and Rotation Equivariance," arXiv:1612.04642v2, pp. 1-15 (Apr. 11, 2017).
Zhu et al., "Unpaired Image-to-Image Translation using Cycle-Consistent Adversarial Networks," Computer Vision Foundation, pp. 1-10 (2017).
Guttenberg et al., "Permutation-equivariant neural networks applied to dynamics prediction," arXiv:1612.04530v1, pp. 1-7 (Dec. 14, 2016).
Cohen et al., "Group Equivariant Convolutional Networks," arXiv:1602.07576v3, pp. 1-12 (Jun. 3, 2016).
Bahdanau et al., "Neural Machine Translation by Jointly Learning to Align and Translate," arXiv:1409.0473v7, pp. 1-15 (May 19, 2016).
Ganin et al., "Domain-Adversarial Training of Neural Networks," Journal of Machine Learning Research, vol. 17, arXiv:1505.07818v4, pp. 1-35 (May 26, 2016).
Moosavi-Dezfooli et al., "DeepFool: a simple and accurate method to fool deep neural networks," 2016 IEEE Conference on Computer Vision and Pattern Recognition, pp. 1-9 (2016).
Karianakis et al., A Empirical Evaluation of Current Convolutional Architectures' Ability to Manage Nuisance Location and Scale Variability, 2016 IEEE Conference on Computer Vision and Pattern Recognition, pp. 1-10 (2016).
Ribeiro et al., "Why Should I Trust You? Explaining the Predictions of Any Classifer," KDD, pp. 1-10 (2016).
Goodfellow et al., "Explaining and Harnessing Adversarial Examples," arXiv:1412.6572v3, pp. 1-11 (Mar. 20, 2015).
Jaderberg et al., "Spatial Transformer Networks," Advances in Neural Information Processing Systems, pp. 1-11 (2015).
LeCun et al., "Deep Learning," Nature, vol. 521, pp. 436-444 (May 28, 2015).
Srivastava et al., "Droupout: A Simple Way to Prevent Neural Networks from Overfitting," Journal of Machine Learning Research, vol. 15, pp. 1-30 (2014).
Szegedy et al., "Intriguing properties of neural networks," arXiv:1312.6199v4, pp. 1-10 (Feb. 19, 2014).
Krizhevsky et al., "ImageNet Classification with Deep Convolutional Neural Networks," Advances in Neural Information Processing Systems, pp. 1-10 (2012).
Zeiler, "ADADELTA: A Adaptive Learning Rate Method," arXiv:1212.5701v1, pp. 1-6 (Dec. 22, 2012).
Glorot et al., "Deep Sparse Rectifier Neural Networks," Proceedings of the 14th International Conference on Artificial Intelligence and Statistics, pp. 315-323 (2011).
Netzer et al., "Reading Digits in Natural Images with Unsupervised Feature Learning," Computer Science, pp. 1-9 (2011).
Stallkamp et al., "The German Traffic Sign Recognition Benchmark: A multi-class classification competition," Proceedings of International Joint Conference on Neural Networks, pp. 1-8 (2011).
Hull, "A Database for Handwritten Text Recognition Research," IEEE Transctions on Pattern Analysis and Machine Intelligence, vol. 16, No. 5, pp. 1-5 (May 1994).
Moody et al. "Architecture Selection Strategies for Neural Networks: Application to Corporate Bond Rating Prediction," Neural Networks in the Capital Markets, pp. 1-27 (1994).

* cited by examiner

MODEL-BASED ROBUST DEEP LEARNING

RELATED APPLICATIONS

This application claims the benefit of U.S. Provisional Patent Application Ser. No. 63/034,355, filed Jun. 3, 2020, the disclosure of which is incorporated herein by reference in its entirety.

GOVERNMENT INTEREST

This invention was made with government support under 1837210 awarded by the National Science Foundation, FA8750-18-C-0090 awarded by the Department of Defense, FA9550-19-1-0265 awarded by Air Force Office of Scientific Research, and W911 NF-17-2-0181 awarded by the Army Research Laboratory. The government has certain rights in the invention.

TECHNICAL FIELD

The subject matter described herein relates generally to computer systems and machine learning. More particularly, the subject matter described herein relates to methods and systems for model-based robust deep learning.

BACKGROUND

Over the last decade, we have witnessed unprecedented breakthroughs in deep learning. Rapidly growing bodies of work continue to improve the state-of-the-art in generative modeling, computer vision, and natural language processing. Indeed, the progress in these fields has prompted large-scale integration of deep learning into a myriad of domains; these include autonomous vehicles, medical diagnostics, and robotics. Importantly, many of these domains are safety-critical, meaning that the detections, recommendations, or decisions made by deep learning systems can directly impact the well-being of humans. To this end, it is essential that the deep learning systems used in safety-critical applications are robust and trustworthy.

SUMMARY

This document describes methods, systems, and computer readable media for model-based robust deep learning. In some examples, a method includes obtaining a model of natural variation for a machine learning task. The model of natural variation includes a mapping that specifies how an input datum can be naturally varied by a nuisance parameter. The method includes training, using the model of natural variation and training data for the machine learning task, a neural network to complete the machine learning task such that the neural network is robust to natural variation specified by the model of natural variation.

The subject matter described herein may be implemented in hardware, software, firmware, or any combination thereof. As such, the terms "function" or "node" as used herein refer to hardware, which may also include software and/or firmware components, for implementing the feature(s) being described. In some exemplary implementations, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1A:
FIGS. 1A and 1B are photos that illustrate a new notion of robustness.
Figure 1A:
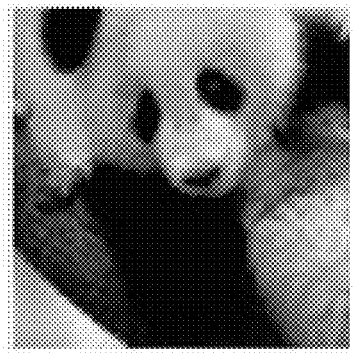

While deep learning has resulted in major breakthroughs in many application domains, the frameworks commonly used in deep learning remain fragile to artificially-crafted and imperceptible changes in the data. In response to this fragility, adversarial training has emerged as a principled approach for enhancing the robustness of deep learning with respect to norm-bounded perturbations. However, there are other sources of fragility for deep learning that are arguably more common and less thoroughly studied. Indeed, natural variation such as lighting or weather conditions can significantly degrade the accuracy of trained neural networks, proving that such natural variation presents a significant challenge for deep learning.

This specification describes a paradigm shift from perturbation-based adversarial robustness toward model-based robust deep learning. Our objective is to provide general training algorithms that can be used to train deep neural networks to be robust against natural variation in data. Critical to our paradigm is first obtaining a model of natural variation which can be used to vary data over a range of natural conditions. Such models may be either known a priori or else learned from data. In the latter case, we show that deep generative models can be used to learn models of natural variation that are consistent with realistic conditions. We then exploit such models in three novel model-based robust training algorithms in order to enhance the robustness of deep learning with respect to the given model.

Our extensive experiments show that across a variety of naturally-occurring conditions and across various datasets including MNIST, SVHN, GTSRB, and CURE-TSR, deep neural networks trained with our model-based algorithms significantly outperform both standard deep learning algorithms as well as norm-bounded robust deep learning algorithms. Our approach can result in accuracy improvements as large as 20-30 percentage points compared to state-of-the-art classifiers on tasks involving challenging natural conditions. Furthermore, our model-based framework is reusable in the sense that models of natural variation can be used to facilitate robust training across different datasets.

Such models can also be composed to provide robustness against multiple forms of natural variation. Lastly, we performed out-of-distribution experiments on the challenging CURE-TSR dataset in which classifiers were trained on images with low levels of natural variation and tested on images with high levels of the same form of variation. We found that classifiers trained using our model-based algorithms improve by as much as 15 percentage points over state-of-the-art classifiers.

Our results suggest that exploiting models of natural variation can result in significant improvements in the robustness of deep learning when deployed in natural environments. This paves the way for a plethora of interesting future research directions, both algorithmic and theoretical, as well as numerous applications in which enhancing the robustness of deep learning will enable its wider adoption with increased trust and safety.

1 Introduction

Over the last decade, we have witnessed unprecedented breakthroughs in deep learning [1]. Rapidly growing bodies of work continue to improve the state-of-the-art in generative modeling [2, 3, 4], computer vision [5, 6, 7], and natural language processing [8, 9]. Indeed, the progress in these fields has prompted large-scale integration of deep learning into a myriad of domains; these include autonomous vehicles, medical diagnostics, and robotics [10, 11]. Importantly, many of these domains are safety-critical, meaning that the detections, recommendations, or decisions made by deep learning systems can directly impact the well-being of humans [12]. To this end, it is essential that the deep learning systems used in safety-critical applications are robust and trustworthy [13].

It is now well-known that many deep learning frameworks including neural networks are fragile to seemingly innocuous and imperceptible changes to their input data [14]. Well-documented examples of such fragility to carefully-designed noise can be found in the context of image detection [15], video analysis [16, 17], traffic sign misclassification [18], machine translation [19], clinical trials [20], and robotics [21]. In addition to this vulnerability to artificial noise, deep learning is also fragile to changes in the environment, such as changes in background scenes or lighting. In all deep learning applications and in particular in safety-critical domains, it is of fundamental importance to improve the robustness of deep learning.

In response to this vulnerability to imperceptible changes, a vastly growing body of work has focused on improving the robustness of deep learning. In particular, the literature concerning adversarial robustness has sought to improve robustness to small, imperceptible perturbations of data, which have been shown to cause misclassification [14]. By and large, works in this vein assume that adversarial data can only be generated by applying a small, norm-bounded perturbation. To this end, the adversarial robustness literature has developed novel robust training algorithms [22, 23, 24, 25, 26, 27, 28] as well as certifiable defenses to norm-bounded data perturbations [29, 30]. Robust training approaches, i.e. the method of adversarial training [31], typically incorporate norm-bounded, adversarial data perturbations in a robust optimization formulation [22, 23].

Adversarial training has provided a rigorous framework for understanding, analyzing, and improving the robustness of deep learning. However, the adversarial framework used in these approaches is limited in that it cannot capture a wide range of natural phenomena. More specifically, while schemes that aim to provide robustness to norm-bounded perturbations can resolve security threats arising from artificial tampering of the data, these schemes do not provide similar levels of robustness to changes that may arise due to more natural variations [15]. Such changes include unseen distributional shifts including variation in image lighting, background color, blurring, contrast, or other weather conditions [32, 33]. In image classification, such variation can arise from changes in the physical environment, such as varying weather conditions, or from imperfections in the camera, such as decolorization or blurring.

It is therefore of great importance to expand the family of robustness models studied in deep learning beyond imperceptible norm-bounded perturbations to include natural and possibly unbounded forms of variation that occur due to natural conditions such as lighting, weather, or camera defects. To capture these phenomena, it is necessary to obtain an accurate model that describes how data can be varied. Such a model may be known a priori, as is the case for geometric transformations such as rotation or scaling. On the other hand, in some settings a model of natural variation may not be known beforehand and therefore must be learned from data. For example, there are not known models of how to change the weather conditions in images. Once such a model has been obtained, it should then be exploited in rethinking the robustness of deep learning against naturally varying conditions.

We propose a paradigm shift from perturbation-based adversarial robustness to model-based robust deep learning. Our objective is to provide general algorithms that can be used to train neural networks to be robust against natural variation in data. To do so, we introduce a robust optimization framework that exploits novel models that describe how data naturally varies to train neural networks to be robust against challenging or worst-case natural conditions. Notably, our approach is model-agnostic and adaptable, meaning that it can be used with models that describe arbitrary forms of variation, regardless of whether such models are known a priori or learned from data. We view this approach as a key contribution to the literature surrounding robust deep learning, especially because robustness to these forms of natural variation has not yet been thoroughly studied in the adversarial robustness community. Our experiments show that across a variety of naturally-occurring and challenging conditions, such as changes in lighting, background color, haze, decolorization, snow, or contrast, and across various datasets, including MNIST, SVHN, GTSRB, and CURE-TSR, neural networks trained with our model-based algorithms significantly outperform both standard baseline deep learning algorithms as well as norm-bounded robust deep learning algorithms.

The contributions of our paper can be summarized as follows:

(Model-based robust deep learning.) We propose a paradigm shift from norm-bounded adversarial robustness to model-based robust deep learning, wherein models of natural variation express changes due to challenging natural conditions.

(Robust optimization formulation.) We formulate the novel problem of model-based robust training by constructing a general robust optimization procedure that searches for challenging model-based variation of data.

(Learned models of natural variation.) For many different forms of natural variation commonly encountered in safety-critical applications, we show that deep generative models can be used to learn models of natural variation that are consistent with realistic conditions.

(Model-based robust training algorithms.) We propose a family of novel robust training algorithms that exploit models of natural variation in order to improve the robustness of deep learning against worst-case natural variation.

(Broad applicability and robustness improvements) We show empirically that models of natural variation can be used in our formulation to provide significant improvements in the robustness of neural networks for several datasets commonly used in deep learning. We report improvements as large as 20-30 percentage points in test accuracy compared to state-of-the-art adversarially robust classifiers on tasks involving challenging natural conditions such as contrast and brightness.

(Reusability and modularity of models of natural variation) We show that models of natural variation can be reused on multiple new and different datasets without retraining to provide high levels of robustness against naturally varying conditions. Further, we show that models of natural variation can be easily composed to provide robustness against multiple forms of natural variation.

While the experiments in this paper focus on image classification tasks subject to challenging natural conditions, our model-based robust deep learning paradigm is much broader and can be applied to many other deep learning domains as long as one can obtain accurate models of how the data can vary in a natural and useful manner.

2 Perturbation-Based Robust Deep Learning

Improving the robustness of deep learning has promoted the development of adversarial training algorithms that defend neural networks against small, norm-bounded perturbations [31]. To make this concrete, we consider a standard classification task in which the data is distributed according to a joint distribution $(x, y) \sim D$ over instances $x \in \mathbb{R}^d$ and corresponding labels $y \in [k] := \{0, 1, \ldots, k\}$. We assume that we are given a suitable loss function $\ell(x,y;w)$ common examples include the cross-entropy or quadratic losses. In this notation, we let $w \in \mathbb{R}^p$ denote the weights of a neural network. The goal of the learning task is to find the weights w that minimize the risk over D with respect to the loss function l. That is, we wish to solve $$\min_w \mathbb{E}_{(x,y) \sim D}[\ell(x, y; w)]. \quad (2.1)$$

As observed in previous work [22, 23], solving the optimization problem stated in (2.1) does not result in robust neural networks. More specifically, neural networks trained by solving (2.1) are known to be susceptible to adversarial attacks. This means that given a datum x with a corresponding label y, one can find another datum $x^{adv}$ such that (1) x is close to $x^{adv}$ with respect to a given Euclidean norm and (2) $x^{adv}$ is predicted by the learned classifier as belonging to a different class $c \neq y$. If such a datum $x^{adv}$ exists, it is called an adversarial example.

The dominant paradigm toward training neural networks to be robust against adversarial examples relies on a robust optimization [35] perspective. In particular, the approach used in [22, 23] to provide robustness to adversarial examples works by considering a distinct yet related optimization problem to (2.1). In particular, the idea is to train neural networks to be robust against a worst-case perturbation of each instance x.

This worst-case perspective can be formulated in the following way:

$$\min_w \mathbb{E}_{(x,y) \sim D}\left[\max_{\delta \in \Delta} \ell(x + \delta, y; w)\right] \quad (2.2)$$

We can think of (2.2) as comprising two coupled optimization problems: an inner maximization problem and an outer minimization problem. First, in the inner maximization problem $\max_{\delta \in \Delta} \ell(x+\delta,y;w)$, we seek a perturbation $\delta \in \Delta$ that results in large loss values when we perturb x by the amount $\delta$. The set of allowable perturbations A is typically of the form $\Delta := \{\delta \in \mathbb{R}^d : \|\delta\|_p \leq \epsilon\}$, meaning that data can be perturbed in a norm-bounded manner for a suitably-chosen Euclidean p-norm. In this sense, any solution $\delta^*$ to the inner maximization problem of (2.2) is a worst-case, norm-bounded perturbation in so much as the datum $x+\delta^*$ is most likely to be classified as any label c other than the true label y. If indeed the trained classifier predicts any class c other than y for the datum $x^{adv} := x+\delta^*$, then $x^{adv}$ is a bona fide adversarial example.

After solving the inner maximization problem of (2.2), we can rewrite the outer minimization problem as $$\min_w \mathbb{E}_{(x,y) \sim D}[\ell(x + \delta^*, y; w)]. \quad (2.3)$$

From this point of view, the goal of the outer minimization problem is to find the weights w that ensure that the worst-case datum $x+\delta^*$ is classified by our model as having label y. To connect robust training to the standard training paradigm for deep networks given in (2.1), note that if $\delta^*=0$ or if $\Delta=\{0\}$ is trivial, then the outer minimization problem (2.3) reduces to (2.1).

Limitations of perturbation-based robustness. While there has been significant progress toward making deep learning algorithms robust against norm-bounded perturbations [22, 23, 24], there are a number of limitations to this approach. Notably, there are many forms of natural variation that are known to cause misclassification. In the context of image classification, such natural variation includes changes in lighting, weather, or background color [18, 36, 37], spatial transformations such as rotation or scaling [38, 39], and sensor-based attacks [27]. These realistic forms of variation of data, which in the computer vision community are known as nuisances, cannot be modeled by the norm-bounded perturbations $x \mapsto x+\delta$ used in the standard adversarial training paradigm of (2.2) [40]. Therefore, an important open question is how deep learning algorithms can be made robust against realistic and natural forms of variation that are often inherent in safety-critical applications.

In this paper, we present a new training paradigm for deep neural networks that provides robustness against a broader class of natural transformations and variation. Rather than perturbing data in a norm-bounded manner, our robust training approach exploits models of natural variation that describe how data changes with respect to particular nuisances. However, we emphasize that our approach is model-agnostic in the sense that it provides a robust learning paradigm that is applicable across broad classes of naturally-occurring data variation. Indeed, in this paper we will show that even if a model of natural variation is not explicitly known a priori, it is still possible to train neural networks to be robust against natural variation by learning a model this variation in an offline and data-driven fashion. More broadly, we claim that the framework described in this paper represents a new paradigm for robust deep learning as it provides a methodology for improving the robustness of deep learning to arbitrary sources of natural variation.

3 Model-Based Robust Deep Learning

3.1 Adversarial Examples Versus Natural Variation

The norm-bounded, perturbation-based robust training formulation of (2.2) provides a principled mathematical foundation for robust deep learning. Indeed, as we showed in the previous section, the problem of defending neural networks against adversaries that can perturb data by a small amount δ in some Euclidean p-norm can be formulated as the robust optimization problem described in (2.2). In this way, solving this optimization problem engenders neural networks that are robust to small but imperceptible noise δ∈Δ. This notion of robustness is illustrated in the canonical example shown in FIG. 1A. In this example, the adversary can arbitrarily change any pixel values in the left-hand-side image to create a new image as long as the perturbation is bounded, meaning that $\delta \in \Delta = \{\delta \in \mathbb{R}^D : \|\delta\|_\infty \leq \epsilon\}$. When ε>0 is small, the two panda bears in FIG. 1A are identical to the eye and yet the small perturbation δ can lead to different classifications, resulting in very fragile deep learning.

Figure 1B:
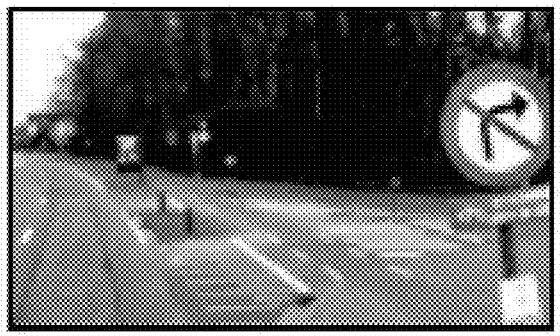
Figure 1B:

While adversarial training provides robustness against the imperceptible perturbations described in FIG. 1A, in natural environments data varies in ways that cannot be captured by norm-bounded perturbations. For example, consider the two traffic signs shown in FIG. 1B. Note that the images on the left and on the right show the same traffic sign; however, the image on the left shows the sign on a sunny day, whereas the image on the right shows the sign in the middle of a snow storm. This example prompts several relevant questions. How do we ensure that neural networks are robust to such natural variation? How can we rethink adversarial training algorithms to provide robustness against natural-varying and challenging data?

Figure 2:
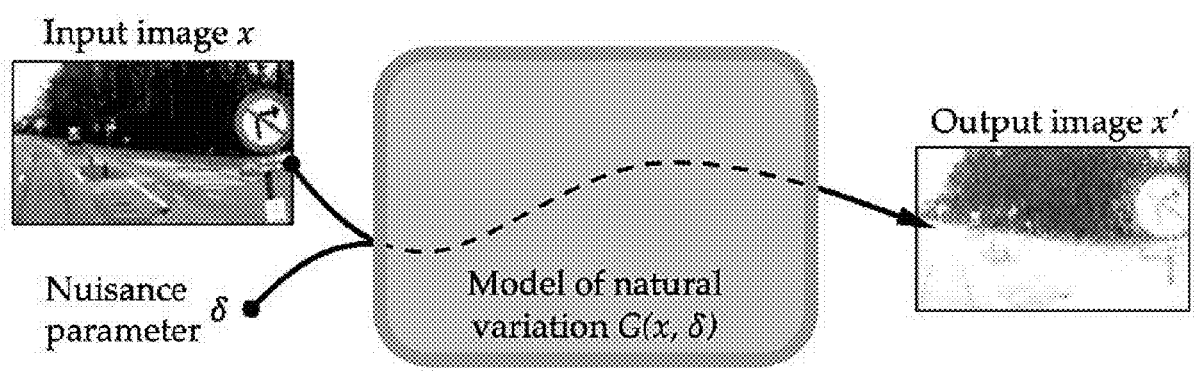
FIG. 2 illustrates models of natural variation.

In this paper we advocate for a new notion of robustness in deep learning with respect to such natural variation or nuisances in the data. Critical to our approach is the existence of a model of natural variation, G(x, δ). Concretely, a model of natural variation G is a mapping that describes how an input datum x can be naturally varied by nuisance parameter δ resulting in image x'. Conceptually, an illustrative example of such a model is shown in FIG. 2, where the input image x on the left (in this case, in sunny weather) can be naturally varied by δ and consequently transformed into the image on the right x':=G(x,δ) (in snowy weather).

For the time being, we assume the existence of such a model of natural variation G(x, δ); later, in Section 4, we will detail our approach for obtaining models of natural variation that correspond to a wide variety of nuisances. In this way, given a model of natural variation G, our goal is to exploit this model toward developing novel model-based robust training algorithms that ensure that trained neural networks are robust to the natural variation captured by the model. For instance, if G models variation in the lighting conditions in an image, our model-based training algorithm will provide robustness to lighting discrepancies. On the other hand, if G models changes in the weather such as in FIG. 1B, then our model-based formulation will improve the robustness of trained neural networks to varying weather conditions. More generally, our model-based robust training formulation is agnostic to the source of natural variation, meaning that our novel robust training paradigm is broadly applicable to any source of natural variation that G can capture.

3.2 Model-Based Robust Training Formulation

In what follows, we provide a mathematical formulation for the model-based robust training paradigm. This formulation will retain the basic elements of adversarial training described in Section 2. In this sense, we again consider a classification task in which the goal is to train a neural network with weights w to correctly predict the label y of a corresponding input instance x, where (x, y)~D. This setting is identical to the setting described in the preamble to equation (2.1).

Our point of departure from the classical adversarial training formulation of (2.2) is in the choice of the so-called adversarial perturbation. In this paper, we assume that the adversary has access to a model of natural variation G(x, δ), which allows it to transform x into a distinct yet related instance by x':=G(x,δ) choosing different values of δ from a given nuisance space Δ. The goal of our model-based robust training problem is to learn a classifier that achieves high accuracy both on a test set drawn i.i.d. from D and on more-challenging test data that has been subjected to the source of natural variation that G models. In this sense, we are proposing a new training paradigm for deep learning that provides robustness against models of natural variation G(x, δ).

In order to defend a neural network against such an adversary, we propose the following model-based robust training formulation:

$$\min_w \mathbb{E}_{(x,y) \sim D} \left[ \max_{\delta \in \Delta} \ell(G(x, \delta), y; w) \right]. \quad (3.1)$$

The intuition for this formulation is conceptually similar to that of (2.2). In solving the inner maximization problem, given an instance-label pair (x, y), the adversary seeks a vector δ*∈Δ that produces a corresponding instance x0:=G (x, d_) which gives rise to high loss values ℓ G(x,δ*),y;w) under the current weight w. One can think of this vector δ* as characterizing the worst-case nuisance that can be generated by the model G(x, δ*) for the original instance x. After solving this inner maximization problem, we solve the outer minimization problem in which we seek weights w that minimize the risk against the challenging instance G(x, δ*). By training the network to correctly classify this worst-case datum, the intuition behind the model-based paradigm is that the neural network should become invariant to the model G(x, δ) for any δ∈Δ and consequently to the original source of natural variation.

The optimization problem posed in (3.1) will be the central object of study in this paper. In particular, we will refer to this problem as the model-based robust training paradigm. In Section 4, we describe how to obtain models of natural variation. Then in in Section 5 we will show how models of natural variation can be used toward developing robust training algorithms for solving (3.1).

Figure 3A:
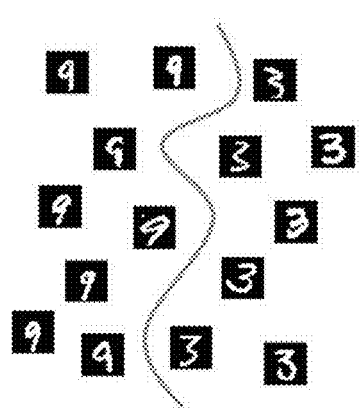
FIGS. 3A-3C illustrate a model-based robustness paradigm.
Figure 3B:
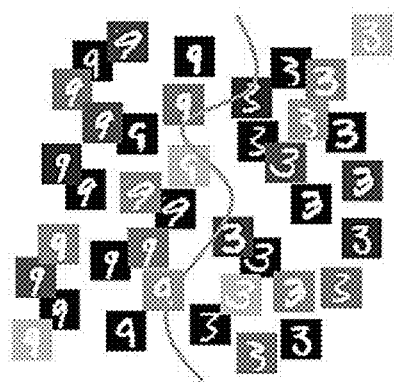
Figure 3C:
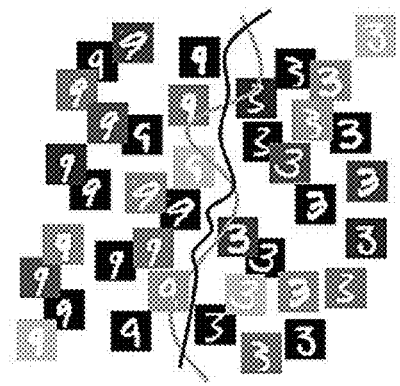

FIGS. 3A-3C illustrate a model-based robustness paradigm. FIG. 3A shows MNIST classification with a classification boundary separating digits with the labels '9' and '3' from the MNIST dataset. FIG. 3B shows introduction of a source of natural variation by changing the background colors of the MNIST digits. FIG. 3C shows robustness boundaries. Given the natural variation, we reclassify the data so that the boundary is robust to changes in background color. The objective of model-based training is to learn a boundary that is robust against nuisances like background color, such as the boundary in FIG. 3C.

3.3 Geometry of Model-Based Robust Training

Figure 4A:
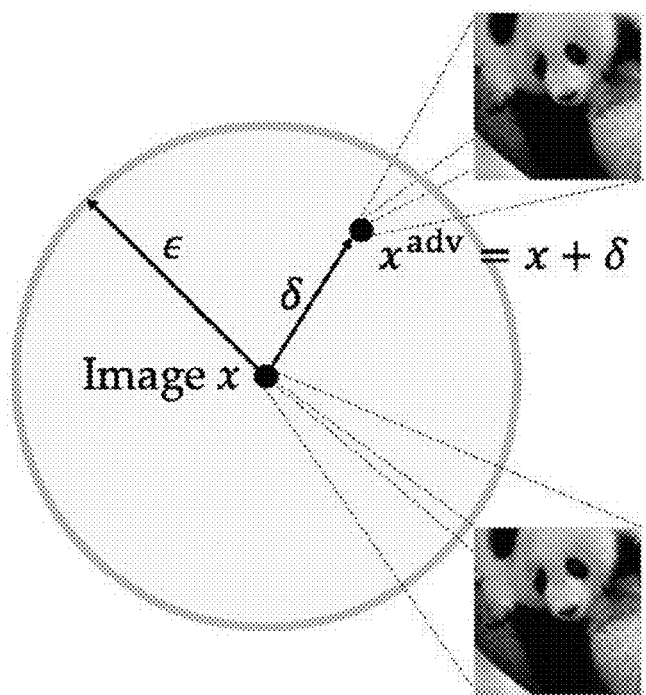
FIGS. 4A-4B illustrate examples of geometry of adversarial and model-based robustness.
Figure 4B:
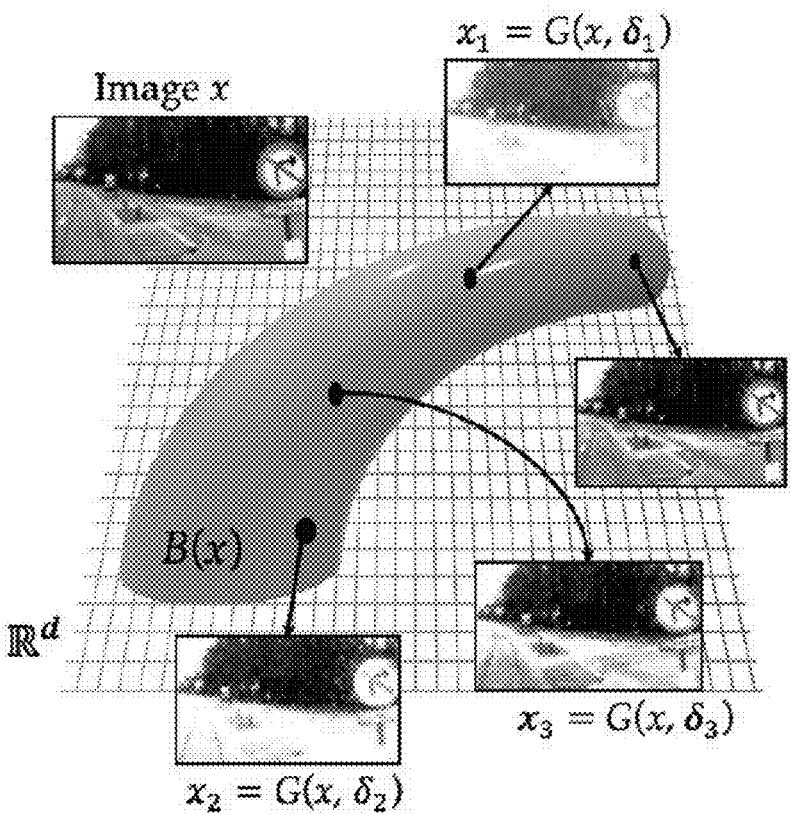

To provide geometric intuition for the model-based robust training formulation, consider FIGS. 4A-4B. The geometry of the classical perturbation-based adversarial training is captured in FIG. 4A, wherein each datum x can be perturbed to any other datum $x^{adv}$ contained in a small ε-neighborhood around x. That is, the data can be additively perturbed via $x \mapsto x^{adv} := x+\delta$ where $\delta$ is constrained to lie in a set $\Delta := \{\delta \in \mathbb{R}^d : \|\delta\|_p \leq \epsilon\}$.

FIG. 4B shows the geometry of the model-based robust training paradigm. Let us consider a task in which our goal is to correctly classify images of street signs in varying weather conditions. In our model-based paradigm, we are equipped with a model G(x, δ) of natural variation that can naturally vary an image x by changing the nuisance parameter $\delta \in \Delta$. For example, if our data contains images x in sunny weather, the model G(x, δ) may be designed to continuously vary the weather conditions in the image without changing the scene or the street sign.

More generally, such model-based variations around x have a manifold-like structure and belong to $B(x) := \{x' \in \mathbb{R}^d : x' = G(x, \delta) \text{ for some } \delta \varepsilon \Delta\}$. Note that in many models of natural variation, the dimension of model parameter $\delta \in \Delta$, and therefore the dimension of manifold B(x), will be significantly lower than the dimension of data $x \in \mathbb{R}^d$. In other words, B(x) will be comprised of submanifolds around x in the data space $\mathbb{R}^d$.

One subtle underlying assumption in the classical adversarial robustness formulation for classification tasks is that the additive perturbation x+δ must preserve the label y of the original datum x. For instance, in FIGS. 4A-4B, it is essential that the mapping $x \mapsto x+\delta$ where $\|\delta\|_p \leq \epsilon$, $\|\delta\|_p^- \leq \epsilon$ produces an example $x^{adv} = x+\delta$ which has the same label as x. Similarly, in this paper we restrict our attention to models G(x, δ) that preserve the semantic label of the input datum x for any $\delta \in \Delta$. In other words, we focus on models G(x, δ) that can naturally vary data x using nuisance parameter δ (e.g. weather conditions, contrast, background color) while leaving the label of the original datum unchanged. In FIG. 4B, this corresponds to all points $x' \in B(x)$ with varying snowy weather having the same label y as the original input datum x.

4 Models of Natural Variation

Our model-based robustness paradigm of (3.1) critically relies on the existence of a model $x \mapsto G(x,\delta) := x'$ that describes how a datum x can be perturbed to x' by the choice of a nuisance parameter $\delta \in \Delta$. In this section, we consider cases in which (1) the model G is known a priori, and (2) the model G is unknown and therefore must be learned offline. In this second case in which models of natural variation must be learned from data, we propose a formulation for obtaining these models.

4.1 Known Models G(x, δ) of Natural Variation

In many problems, the model G(x, δ) is known a priori and can immediately be exploited in our robust training formulation. One direct example in which a model of natural variation G(x, δ) is known is the classical adversarial training paradigm described by equation (2.2). Indeed, by inspecting equations (2.2) and (3.1), we can immediately extract the well-known norm-bounded adversarial model $$G(x,\delta)=x+\delta \text{ for } \delta\in\Delta:=\{\delta\in\mathbb{R}^d:\|\epsilon\|_p\leq\epsilon\} \quad (4.1)$$

The above example of a known model shows that in some sense the perturbation-based adversarial training paradigm of equation (2.2) is a special case of the model-based robust training formulation (3.1) when G(x, δ)=x+δ. Of course, for this choice of adversarial perturbations there is a plethora of robust training algorithms [22, 23, 24, 25, 26, 27, 28].

Figure 5:
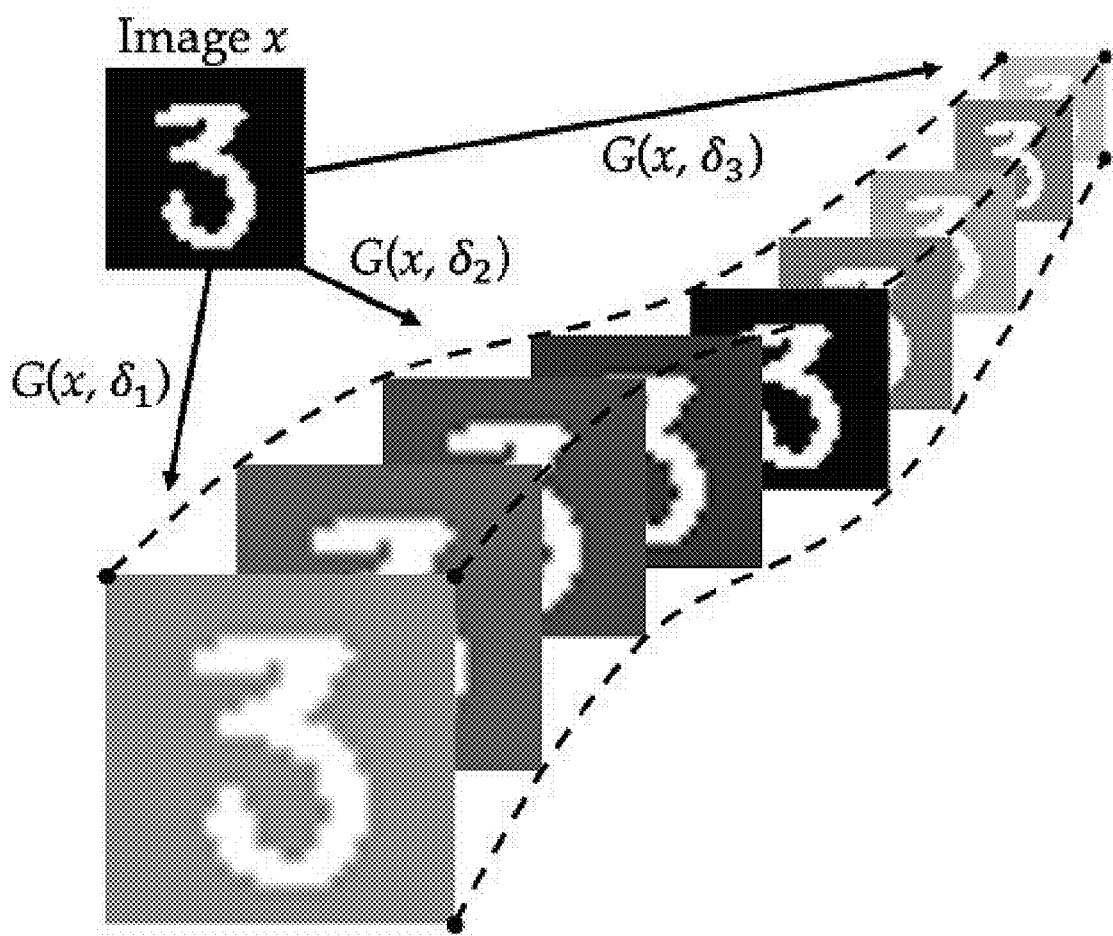
FIG. 5 illustrates known models of natural variation.

Another example of a known model of natural variation is shown in FIG. 5. Consider a scenario where we would like to be robust to background color changes in the MNIST dataset. This would require having a model G(x, δ) that takes an MNIST digit x as input and reproduces the same digit but with various colorized RGB backgrounds which correspond to different values of $\delta \in \Delta$.

Moreover, there are many problems in which naturally-occurring variation in the data has structure that is known a priori. For example, in image classification tasks there are usually intrinsic geometric structures that identify how data can be rotated, translated, or scaled. Geometric models for rotating an image along a particular axis can be characterized by a one-dimensional angular parameter δ. In this case, a known model of natural variation for rotation can be described by $$G(x,\delta)=R(\delta)x \text{ for } \delta\in\Delta:=[0,2\pi) \quad (4.2)$$

where R(δ) is a rotation matrix. Such geometric models can facilitate adversarial distortions of images using a low dimensional parameter δ. In prior work, this idea has been exploited to train neural networks to be robust to rotations of the data around a given axis [41, 42, 43].

More generally, geometric and spatial transformations have been explored in the field of computer vision in the development of equivariant neural network architectures. In many of these studies, one considers a transformation T: $\mathbb{R}^d \times \Delta \to \mathbb{R}^d$ where Δ has a group structure. By definition, we say that a function ƒ is equivariant with respect to T if $f(T(x,\delta))=T(f(x),\delta)$ for all $\delta \in \Delta$. That is, applying T to an input x and then applying ƒ to the result is equivalent to applying T to ƒ(x). In contrast to the equivariance literature in computer vision, much of the adversarial robustness community has focused on what is often called invariance. A function ƒ is said to be invariant to T if $f(T(x,\delta)) \times f(x)$ for any $\delta \in \Delta$, meaning that transforming an input x by T has no impact on the output. This has prompted significant research toward designing neural networks that are equivariant to such transformations of data [6, 7, 44, 45, 46]. Recently, this has been extended to leveraging group convolutions, which can be used to provide equivariance with respect to certain symmetric groups [47] and to permutations of data [48].

In our context, these structured transformations of data T: $\mathbb{R}^d \times \Delta \to \mathbb{R}^d$ can be viewed as models of natural variation by directly setting G(x, δ)=T(x, δ) where Δ may have additional group structure. While previous approaches exploit such transformations for designing deep network architectures that respect this structure, our goal is to exploit such known structures toward developing robust training algorithms.

Altogether, these examples show that for a variety of problems, known models can be used to analytically describe how data changes. Such models typically take a simple form according to underlying geometric or physical laws. In such cases, a known model can be exploited for robust training as has been done in the past literature. In the context of known models, our model-based approach offers a more general framework that is model-agnostic in the sense that it is applicable to all such models of how data varies. As shown above, in some cases, our model-based formulation also recovers several well-known adversarial robustness formulations. More importantly, the generality of our approach enables us to pursue model-based robust training even when a model G(x, δ) is not known a priori. This is indeed the case in the context of natural variation in images due to nuisances such as lighting, snow, rain, decolorization, haze, and many others. For such problems, in the next section we will show how to learn models of natural variation G(x, δ) from data.

4.2 Learning Unknown Models of Natural Variation G(x, δ) from Data

While geometry and physics may provide known analytical models that can be exploited toward robust training of neural networks, in many situations such models are not known or are too costly to obtain. For example, consider FIG. 4B in which a model of natural variation G(x, δ) describes the impact of adding snowy weather to an image x. In this case, the transformation G(x, δ) takes an image x of a street sign in sunny weather and maps it to an image x'=G(x, δ) in snowy weather. Even though there is a relationship between the snowy and the sunny images, obtaining a model G relating the two images is extremely challenging if we resort to physics or geometric structure. For such problems with unknown models we advocate for learning the model G(x, δ) from data prior to model-based robust training. That is, we propose first learning a model of natural variation G(x, δ) offline using some previously collected data; following this process, we will use the learned model to perform robust training on a new and possibly different data set.

In order to learn an unknown model G(x, δ), we assume that we have access to two unpaired image domains A and B that are drawn from a common dataset or distribution. In our setting, domain A contains the original data, such as the image of the traffic sign in sunny weather in FIG. 2, and domain B contains data transformed by the underlying natural phenomena. For instance, the data in domain B may contain images of street signs in snowy weather. We emphasize that the domains A and B are unpaired, meaning that it may not be possible to select an image of a traffic sign in sunny weather from domain A and find a corresponding image of that same street sign in the same scene with snowy weather in domain B. Our approach toward formalizing the idea of learning G(x, δ) from data is to view G as a mechanism that transforms the distribution of data in domain A so that it resembles the distribution of data in domain B. More formally, let $\mathbb{P}_A$ and $\mathbb{P}_B$ be the data distributions corresponding to domains A and B respectively. Our objective is to find a mapping G that takes as input a datum $x \sim \mathbb{P}_A$ and a nuisance parameter $\delta \in \Delta$ and then produces a new datum $x' \sim \mathbb{P}_B$. Statistically speaking, the nuisance parameter δ represents the extra randomness or variation required to generate x' from x. For example, when considering images with varying weather conditions, the randomness in the nuisance might control whether an image of a sunny scene is mapped to a corresponding image with a dusting of snow or to an image in an all-out blizzard. In this way, we without loss of generality we assume that the nuisance parameter is independently generated from a simple distribution $\mathbb{P}_\Delta$ (e.g. uniform or Gaussian) to represent the extra randomness required to generate x' from x. Using this formalism, we can view G(·,·) as a mapping that transforms the distribution $\mathbb{P}_A \times \mathbb{P}_\Delta$ into the distribution $\mathbb{P}_B$. More specifically, G pushes forward the measure $\mathbb{P}_A \times \mathbb{P}_\Delta$, which is defined over A×Δ, to $\mathbb{P}_B$, which is defined over B. That is, $\mathbb{P}_B = G\#(\mathbb{P}_A \times \mathbb{P}_\Delta)$, where # denote the push-forward measure.

Now in order to learn a model of natural variation G, we consider a parametric family of models $\mathcal{G} := \{G_\theta : \theta \in \Theta\}$ defined over a parameter space $\Theta \subset \mathbb{R}^m$. We can express the problem of learning a model of natural variation $G_{\theta^*}$ parameterized by $\theta^* \in \Theta$ that best fits the above formalism in the following way:

$$\theta^* = \underset{\theta \in \Theta}{\operatorname{argmin}} \; d(\mathbb{P}_B, G_\theta \#(\mathbb{P}_A \times \mathbb{P}_\Delta)). \tag{4.3}$$

Here d(·,·) is an appropriately-chosen distance metric that measures the distance between two probability distributions (e.g. the KL-divergence, total variation, Wasserstein distances, etc.). This formulation has received broad interest in the machine learning community thanks to the recent advances in generative modeling. In particular, in the fields of image-to-image translation and style-transfer, learning mappings between unpaired image domains is a well-studied problem [4, 50, 51]. In the next subsection, we will show how the breakthroughs in these fields can be used to learn a model of natural variation G that approximates underlying natural phenomena.

Figure 6:
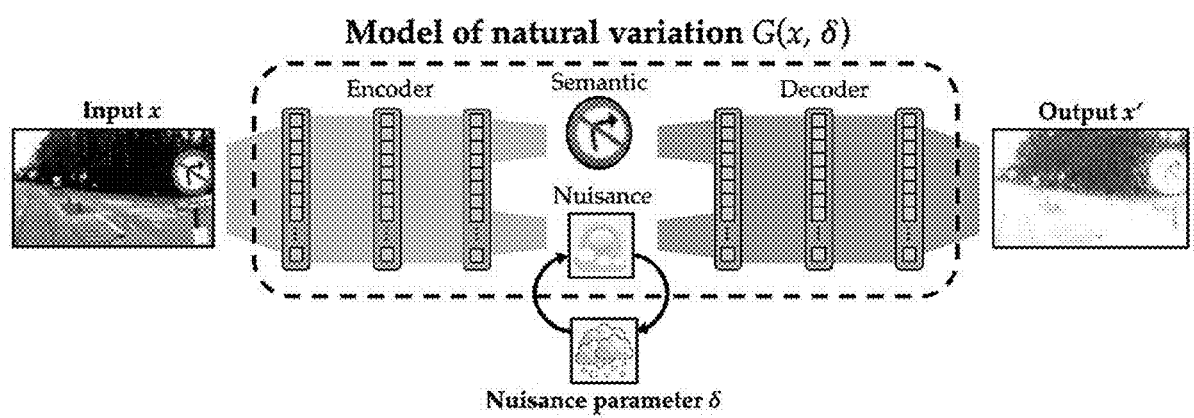
FIG. 6 is a block diagram illustrating learning unknown models of natural variation.

FIG. 6 is a block diagram illustrating learning unknown models of natural variation. In the case when a model of natural variation is not explicitly known, it is still possible to learn a suitable model from data. For image data, we choose to exploit breakthroughs in style-transfer and generative modeling as a framework for learning G(x, δ) from data. Many such architectures use an encoder-decoder network structure, in which an encoding network learns to separate semantic from nuisance content in two latent spaces, and the decoder learns to reconstruct an image from the representations in these latent spaces.

4.3 Using Deep Generative Models to Learn Models of Natural Variation for Images Recall that in order to learn a model of natural variation from data, we aim to solve (4.3) and consequently discover a model $G_{\theta^*}$ that transforms $x \sim \mathbb{P}_A$ into corresponding samples $x' \sim \mathbb{P}_B$. Importantly, a number of methods have been designed toward achieving this goal. In the fields of image-to-image translation, such methods include Cycle-GAN [2], DualGAN [51], Augmented CycleGAN [53], BicycleGAN [50], CSVAE [52], UNIT [54], and MUNIT [4]. Among these methods, CSVAE, BicycleGAN, Augmented CycleGAN, and MUNIT seek to learn multimodal mappings that disentangle the semantic content of a datum (i.e. its label or the characterizing component on the image) from the nuisance content (e.g. background color, weather conditions, etc.) by solving the statistical problem of (4.3). We highlight these methods because learning a multimodal mapping is a concomitant property toward learning models that can produce images with varying nuisance content. To this end, in this paper we will predominantly use MUNIT, which stands for Unsupervised Multimodal Image-to-Image Translation, to learn models of natural variation.

At its core, MUNIT combines two autoencoding networks and two generative adversarial networks (GANs) to learn two mappings: one that maps images from domain A to corresponding images in B and one that maps in the other direction from B to A. For the purposes of this paper, we will only exploit the mapping from A to B, although the systems and methods described in this specification can incorporate both mappings. For the remainder of this section, we will let G denote this mapping from A to B. In essence, the map G: A×Δ→B learned in the MUNIT framework can be thought of as taking as input an image $x \in A$ and a nuisance parameter $\delta \in \Delta$ and outputting an image $x' \in B$ that has the same semantic content as the input image x but that has different nuisances.

Figure 7:
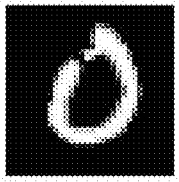
FIG. 7 shows images from several datasets and corresponding images generated by models of natural variation.

In Table 1, which is shown in FIG. 7, we show images from several datasets and corresponding images generated by models of natural variation learned using the MUNIT framework. Each of these learned models of natural variation corresponds to a different source of natural variation. In each of these models, we used a two dimensional latent space $\Delta \subset \mathbb{R}^2$ and generated the output images by sampling different values from $\Delta$. Throughout the paper, we will let $\mathbb{P}_\Delta$ be a standard normal Gaussian distribution $\mathcal{N}(0,1)$.

In the next section, we will begin by assuming that a model of natural variation $G(x, \delta)$ is given—whether G is a known model or G has been learned from data—and then show how G can be leveraged toward formulating model-based robust training algorithms.

5 Model-Based Robust Training Algorithms

In the previous section, we described a procedure that can be used to obtain a model of natural variation $G(x, \delta)$. In some cases, such models may be known a priori while in other cases such models may be learned offline from data. Regardless of their origin, we will now assume that we have access to a suitable model $G(x, \delta)$ and shift our attention toward exploiting G in the development of novel robust training algorithms for neural networks.

To begin, recall the optimization-based formulation of (3.1). Given a model G, (3.1) is a nonconvex-nonconcave min-max problem, and is therefore difficult to solve exactly. We will therefore resort to approximate methods for solving this challenging optimization problem. To elucidate our approach for solving (3.1), we first characterize the problem in the finite-sample setting. That is, rather than assuming access to the full joint distribution $(x,y) \| \mathcal{D}$, we assume that we are given a finite number of samples $\mathcal{D}_n := \{(x^{(j)}, y^{(j)})\}_{j=1}^n$ distributed i.i.d. according to the true data distribution D. The empirical version of (3.1) in the finite-sample setting can be expressed in the following way:

$$\min_w \frac{1}{n} \sum_{j=1}^n \left[ \max_{\delta \in \Delta} \ell(G(x^{(j)}, \delta), y^{(j)}; w) \right]. \quad (5.1)$$

Concretely, we search for the parameter w that induces the smallest empirical error while each sample $(x^{(j)}, y^{(j)})$ is varied according to $G(x^{(j)}, \delta)$. In particular, while subjecting each datum $(x^{(j)}, y^{(j)})$ to the source of natural variation modeled by G, we search for nuisance parameters $\delta \in \Delta$ so as to train the classifier on the most challenging natural conditions.

When the learnable weights w parameterize a neural network $f_w$, the outer minimization problem and the inner maximization problem are inherently nonconvex and non-concave respectively. Therefore, we will rely on zeroth- and first-order optimization techniques for solving this problem to a locally optimal solution. We will propose three algorithmic variants: (1) Model-based Robust Training (MRT), (2) Model-based Adversarial Training (MAT), and (3) Model-based Data Augmentation (MDA). At a high level, each of these methods involves augmenting the original training set $D_n$ with new data generated by the model of natural variation G. Past approaches have used similar adversarial [22] and statistical [58] augmentation techniques. However, the main differences between the past work and our algorithms concern how our algorithms exploit models of natural variation G to generate new data. In particular, MRT randomly queries G to generate several new data points and then selects those generated data that induce the highest loss in the inner-maximization problem. On the other hand, MAT employs a gradient-based search in the nuisance space $\Delta$ to find loss-maximizing generated data. Finally, MDA augments the training set with generated data by sampling randomly in $\Delta$. We now describe each algorithm in detail.

5.1 Model-Based Robust Training (MRT)

In general, solving the inner maximization problem in (5.1) is difficult and motivates the need for methods that yield approximate solutions. In this vein, one simple scheme is to sample different values of the nuisance parameter $\delta \in \Delta$ for each instance-label pair $(x^{(j)}, y^{(j)})$ and among those sampled values, find the nuisance parameter $\delta^{adv}$ that gives the highest empirical loss under G. Indeed, this approach is not designed to find an exact solution to the inner maximization problem; rather it aims to find a difficult example by sampling in the nuisance space of the model.

Once we obtain this difficult example via sampling in $\Delta$, the next objective is to solve the outer minimization problem. The procedure we propose in this paper for solving this problem amounts to using the worst-case nuisance parameter $\delta^{adv}$ obtained via the inner maximization problem to perform data-augmentation. That is, for each instance-label pair $(x^{(j)}, y^{(j)})$, we treat $(G(x^{(j)}, \delta_{adv}^{(j)}), y^{(j)})$ as a new instance-label pair that can be used to supplement the original dataset $D_n$. These training data can be used together with first-order optimization methods to solve the outer minimization problem to a locally optimal solution $w^*$.

Algorithm 1 contains the pseudocode for this model-based robust training approach. In particular, in lines 4-13, we search for a difficult example by sampling in $\Delta$ and picking the parameter $\delta^{adv} \in \Delta$ that induces the highest empirical loss. Then in lines 15-16, we calculate a stochastic gradient of the loss with respect to the model parameter; we then use this gradient to update the model parameter using a first-order method. There a number of potential algorithms for this Update function in line 16, including stochastic gradient descent (SGD), Adam [59], and Adadelta [60].

Throughout the experiments in the attached Appendix, we will train classifiers via MRT with different values of k. In this algorithm, k controls the number of data points we consider when searching for a loss-maximizing datum. To make clear the role of k in this algorithm, we will refer to Algorithm 1 as MRT-k when appropriate.

---

Algorithm 1 Model-based Robust Training (MRT)

Input: data sample $\mathcal{D}_n = \{(x^{(j)}, y^{(j)})\}_{j=1}^n$, model G, weight initialization w, parameter $\lambda \in [0, 1]$, numer of steps k, batch size $m \leq n$
Output: learned weight w
1: repeat
2:     for minibatch $B_m := \{(x^{(1)}, y^{(1)}), (x^{(2)}, y^{(2)}), \ldots, (x^{(m)}, y^{(m)})\} \subset \mathcal{D}_n$ do

| Algorithm 1 Model-based Robust Training (MRT) |
| --- |
| 3: |
| 4:     Initialize max_loss ← 0 |
| 5:     Initialize $\delta_{adv} := (\delta_{adv}^{(1)}, \delta_{adv}^{(2)}, \ldots, \delta_{adv}^{(m)}) \leftarrow (0_q, 0_q, \ldots, 0_q)$ |
| 6:     for k steps do |
| 7:        Sample $\delta^{(j)}$ randomly from $\Delta$ for $j = 1, \ldots, m$ |
| 8:        $\text{current\_loss} \leftarrow \sum_{j=1}^{m} \ell\left(G\left(x^{(j)}, \delta^{(j)}\right), y^{(j)}; w\right)$ |
| 9:        if current_loss > max_loss then |
| 10:          max_loss ← current_loss |
| 11:          $\delta_{adv}^{(j)} \leftarrow \delta^{(j)}$ for $j = 1, \ldots, m$ |
| 12:        end if |
| 13:     end for |
| 14: |
| 15:     $g \leftarrow \nabla_w \sum_{j=1}^{m} \left[\ell\left(G\left(x^{(j)}, \delta_{adv}^{(j)}\right), y^{(j)}; w\right) + \lambda \cdot \ell\left(x^{(j)}, y^{(j)}; w\right)\right]$ |
| 16:     w ← Update(g, w) |
| 17:   end for |
| 18: until convergence |

5.2 Model-Based Adversarial Training (MAT)

At first look, the sampling-based approach used by MRT may not seem as powerful as a first-order (i.e. gradient-based) adversary that has been shown to be effective at improving the robustness of trained classifiers [61] against norm-bounded, perturbation-based attacks. Indeed, it is natural to extend the ideas encapsulated in this previous work that advocate for first-order adversaries to this model-based setting. That is, under the assumption that our model of natural variation $G(x, \delta)$ is differentiable, in principle we can use projected gradient ascent (PGA) in the nuisance space $\Delta \subset \mathbb{R}^q$ of a given model to solve the inner maximization problem. This idea motivates the formulation of our second algorithm, which we call Model-based Adversarial Training (MAT).

In Algorithm 2, we present pseudocode for MAT. Notably, by ascending the stochastic gradient with respect to $\delta_{adv}$ in lines 4-8, we seek a nuisance parameter $\delta_{adv}^*$ that maximizes the empirical loss. In particular, in line 7 we perform the update step of PGA to obtain $\delta_{adv}$; in this notation, $\Pi_\Delta$ denotes the projection onto the set $\Delta$. However, performing PGA until convergence at each iteration leads to a very high computational complexity. Thus, at each training step, we perform k steps of projected gradient ascent. Following this procedure, we use this loss-maximization nuisance parameter $\delta_{adv}^*$ to augment $D_n$ with data subject to worst-case nuisance variability. The update step is then carried out by computing the stochastic gradient of the loss over the augmented training sample with respect to the learnable weights w in line 10. Finally, we update w in line 11 in a similar fashion as was done in the description of the MRT algorithm.

An empirical analysis of the performance of MAT will be given in the Appendix. To emphasize the role of the number of gradient steps k used to find a loss maximizing nuisance parameter $\delta_{adv}^* \in \Delta$, we will often refer to Algorithm 2 as MAT-k.

| Algorithm 2 Model-based Adversarial Training (MAT) |
| --- |
| Input: data sample $\mathcal{D}_n = \{(x^{(j)}, y^{(j)})\}_{j=1}^n$, model G, weight initialization w, parameter $\lambda \in [0, 1]$, number of steps k, batch size $m \leq n$ |
| Output: learned weight w |
| 1: repeat |
| 2:    for minibatch $B_m := \{(x^{(1)}, y^{(1)}), (x^{(2)}, y^{(2)}), \ldots, (x^{(m)}, y^{(m)})\} \subset \mathcal{D}_n$ do |
| 3: |
| 4:        Initialize $\delta_{adv} := (\delta_{adv}^{(1)}, \delta_{adv}^{(2)}, \ldots, \delta_{adv}^{(m)}) \leftarrow (0_q, 0_q, \ldots, 0_q)$ |
| 5:        for k steps do |
| 6:            $g \leftarrow \nabla_{\delta_{adv}} \sum_{j=1}^{m} \ell\left(G\left(x^{(j)}, \delta_{adv}^{(j)}\right), y^{(j)}; w\right)$ |
| 7:            $\delta_{adv} \leftarrow \Pi_\Delta [\delta_{adv} + \alpha g]$ |
| 8:        end for |
| 9: |
| 10:       $g \leftarrow \nabla_w \sum_{j=1}^{m} \left[\ell\left(G\left(x^{(j)}, \delta_{adv}^{(j)}\right), y^{(j)}; w\right) + \lambda \cdot \ell\left(x^{(j)}, y^{(j)}; w\right)\right]$ |
| 11:       w ← Update(g, w) |

| Algorithm 2 Model-based Adversarial Training (MAT) |
|---|
| 12:   end for |
| 13: until convergence |

5.3 Model-Based Data Augmentation (MDA)

Both MRT and MAT adhere to the common philosophy of selecting loss-maximizing, model-generated data to augment the original training dataset $D_n$. That is, in keeping with the min-max formulation of (3.1), both of these methods search adversarially over $\Delta$ to find challenging natural variation. More specifically, for each data point $(x^{(j)}, y^{(j)})$, these algorithms select $\delta \in \Delta$ such that $G(x^{(j)}, \delta) =: x_{adv}^{(j)}$ maximizes the loss term $\ell(x_{adv}^{(j)}, y^{(j)}; w)$. The guiding principle behind these methods is that by $\ell$ showing the neural network these challenging, model-generated data during training, the trained neural network will be able to robustly classify data over a wide spectrum of natural variations.

Another interpretation of (3.1) is as follows. Rather than taking an adversarial point of view in which we expose neural networks to the most challenging model-generated examples, an intriguing alternative is to expose these networks to a diversity of model-generated data during training.

In this approach, by augmenting $D_n$ with model-generated data corresponding to a wide range of natural variations $\delta \in \Delta$, one might hope to achieve higher levels of robustness with respect to a given model of natural variation $G(x, \delta)$.

This idea motivates the third and final algorithm, which we call Model-based Data Augmentation (MDA). The pseudocode for this algorithm is given in Algorithm 3. Notably, rather than searching adversarially over $\Delta$ to find model-generated data subject to worst-case (i.e. loss-maximizing) natural variation, in lines 4-8 of MDA we randomly sample in $\Delta$ to obtain a diverse array of nuisance parameters. For each such nuisance parameter, we augment $D_n$ with a new datum and calculate the stochastic gradient with respect to the weights w in line 10 using both the original dataset $D_n$ and these diverse augmented data.

In MDA, the parameter k controls the number of model-based data points per data point in $D_n$ that we append to the training set. To make this explicit, we will frequently refer to Algorithm 3 as MDA-k.

| Algorithm 3 Model-Based Data Augmentation (MDA) |
|---|
| Input: data sample $\mathcal{D}_n = \{(x^{(j)}, y^{(j)})\}_{j=1}^n$, model G, weight initialization w, parameter $\lambda \in [0, 1]$, number of steps k, batch size m $\leq$ n |
| Output: learned weight w |
| 1: repeat |
| 2:   for minibatch $B_m := \{(x^{(1)}, y^{(1)}), (x^{(2)}, y^{(2)}), \ldots, (x^{(m)}, y^{(m)})\} \subset \mathcal{D}_n$ do |
| 3: |
| 4:     Initialize $x_i^{(j)} \leftarrow 0_d$ for i = 1, ..., k and for j = 1, ..., m |
| 5:     for k steps do |
| 6:       Sample $\delta^{(j)}$ randomly from $\Delta$ for j = 1, ..., m |
| 7:       $x_i^{(j)} \leftarrow G(x^{(j)}, \delta^{(j)})$ for j = 1, ..., m |
| 8:     end for |
| 9: |
| 10:    $g \leftarrow \nabla_w \sum_{j=1}^{m} \left[ \sum_{i=1}^{k} \ell\left(x_i^{(j)}, y^{(j)}; w\right) + \lambda \cdot \ell\left(x^{(j)}, y^{(j)}; w\right) \right]$ |
| 11:    w $\leftarrow$ Update(g, w) |
| 12:  end for |
| 13: until convergence |

Figure 8:
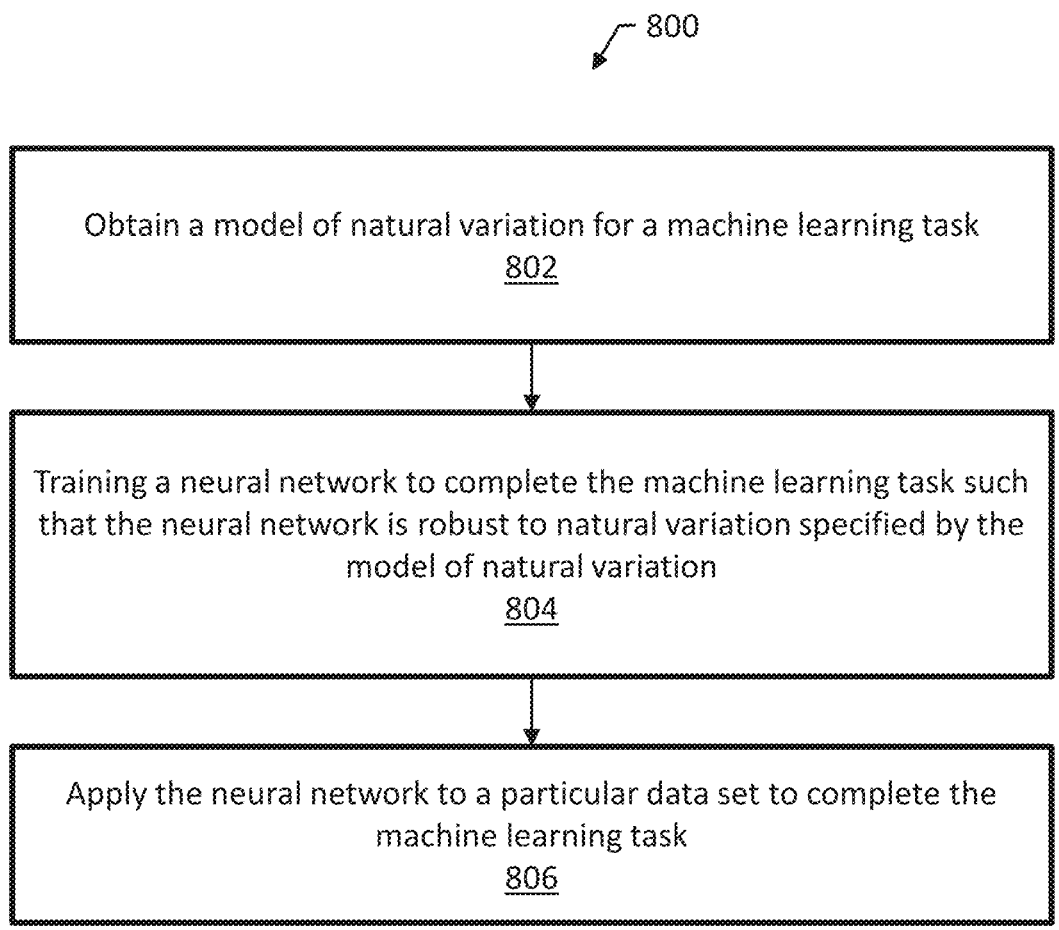
FIG. 8 is a flow diagram of an example method for model-based deep robust learning.

FIG. 8 is a flow diagram of an example method 800 for model-based deep robust learning. The method 800 can be performed by a computer systems, for example, a machine learning trainer implemented on at least one processor.

The method 800 includes obtaining a model of natural variation for a machine learning task (802). The model of natural variation includes a mapping that specifies how an input datum can be naturally varied by a nuisance parameter. Obtaining the model of natural variation can include obtaining an a priori model of natural variation. Obtaining the model of natural variation can include learning the model of natural variation offline using previously collected data.

The method 800 includes training, using the model of natural variation and training data for the machine learning task, a neural network to complete the machine learning task such that the neural network is robust to natural variation specified by the model of natural variation (804). Training the neural network can include searching for at least one new data point that induces a highest loss in modeling optimization.

Training the neural network can include randomly querying the model of natural variation to generate a plurality of new data points and selecting, from the new data points, at least one new data point that induces a highest loss in modeling optimization. Training the neural network can include using a gradient-based search in a nuisance space to find at least one new data point that induces a highest loss in modeling optimization.

Training the neural network can include augmenting the training data with new data generated by the model of natural variation. Augmenting the training data comprises randomly sampling a nuisance space to find a plurality of new data points to add to the training data.

The method 800 includes applying the trained neural network to a particular data set to complete the machine learning task (806). The machine learning task can be, for example, a computer vision task, such as object recognition. Where the machine learning task is a computer vision task, obtaining the model of natural variation can include using a deep generative model learn the model of natural variation from a plurality of images for the computer vision task.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

REFERENCES

[1] Yann LeCun, Yoshua Bengio, and Geoffrey Hinton. Deep learning. Nature, 521(7553):436-444, 2015.

[2] Jun-Yan Zhu, Taesung Park, Phillip Isola, and Alexei A Efros. Unpaired image-to-image translation using cycle-consistent adversarial networks. In Proceedings of the IEEE international conference on computer vision, pages 2223-2232, 2017.

[3] Andrew Brock, Jeff Donahue, and Karen Simonyan. Large scale gan training for high fidelity natural image synthesis. arXiv preprint arXiv:1809.11096, 2018.

[4] Xun Huang, Ming-Yu Liu, Serge Belongie, and Jan Kautz. Multimodal unsupervised image-to-image translation. In Proceedings of the European Conference on Computer Vision (ECCV), pages 172-189, 2018.

[5] Sara Sabour, Nicholas Frosst, and Geoffrey E Hinton. Dynamic routing between capsules. In Advances in neural information processing systems, pages 3856-3866, 2017.

[6] Max Jaderberg, Karen Simonyan, Andrew Zisserman, et al. Spatial transformer networks. In Advances in neural information processing systems, pages 2017-2025, 2015.

[7] Carlos Esteves, Christine Allen-Blanchette, Xiaowei Zhou, and Kostas Daniilidis. Polar transformer networks. arXiv preprint arXiv:1709.01889, 2017.

[8] Jacob Devlin, Ming-Wei Chang, Kenton Lee, and Kristina Toutanova. Bert: Pre-training of deep bidirectional transformers for language understanding. arXiv preprint arXiv:1810.04805, 2018.

[9] Dzmitry Bahdanau, Kyunghyun Cho, and Yoshua Bengio. Neural machine translation by jointly learning to align and translate. arXiv preprint arXiv:1409.0473, 2014.

[10] Marco Tulio Ribeiro, Sameer Singh, and Carlos Guestrin. "why should i trust you?" explaining the predictions of any classifier. In Proceedings of the 22nd ACM SIGKDD international conference on knowledge discovery and data mining, pages 1135-1144, 2016.

[11] Andre Esteva, Alexandre Robicquet, Bharath Ramsundar, Volodymyr Kuleshov, Mark De-Pristo, Katherine Chou, Claire Cui, Greg Corrado, Sebastian Thrun, and Jeff Dean. A guide to deep learning in healthcare. Nature medicine, 25(1):24-29, 2019.

[12] Luke Oakden-Rayner, Jared Dunnmon, Gustavo Carneiro, and Christopher Re. Hidden stratification causes clinically meaningful failures in machine learning for medical imaging. In Proceedings of the ACM Conference on Health, Inference, and Learning, pages 151-159, 2020.

[13] Tommaso Dreossi, Alexandre Donze, and Sanjit A Seshia. Compositional falsification of cyber-physical systems with machine learning components. Journal of Automated Reasoning, 63(4):1031-1053, 2019.

[14] Christian Szegedy, Wojciech Zaremba, Ilya Sutskever, Joan Bruna, Dumitru Erhan, Ian Goodfellow, and Rob Fergus. Intriguing properties of neural networks. arXiv preprint arXiv:1312.6199, 2013.

[15] Dan Hendrycks and Thomas Dietterich. Benchmarking neural network robustness to common corruptions and perturbations. arXiv preprint arXiv:1903.12261, 2019.

[16] Xingxing Wei, Jun Zhu, Sha Yuan, and Hang Su. Sparse adversarial perturbations for videos. In Proceedings of the AAAI Conference on Artificial Intelligence, volume 33, pages 8973-8980, 2019.

[17] Vaishaal Shankar, Achal Dave, Rebecca Roelofs, Deva Ramanan, Benjamin Recht, and Ludwig Schmidt. A systematic framework for natural perturbations from videos. arXiv preprint arXiv:1906.02168, 2019.

[18] Kevin Eykholt, Ivan Evtimov, Earlence Fernandes, Bo Li, Amir Rahmati, Chaowei Xiao, Atul Prakash, Tadayoshi Kohno, and Dawn Song. Robust physical-world attacks on deep learning visual classification. In Proceedings of the IEEE Conference on Computer Vision and Pattern Recognition, pages 1625-1634, 2018.

[19] Eric Wallace, Mitchell Stern, and Dawn Song. Imitation attacks and defenses for black-box machine translation systems. arXiv preprint arXiv:2004.15015, 2020.

[20] Konstantinos Papangelou, Konstantinos Sechidis, James Weatherall, and Gavin Brown. Toward an understanding of adversarial examples in clinical trials. In Joint European Conference on Machine Learning and Knowledge Discovery in Databases, pages 35-51. Springer, 2018.

[21] Marco Melis, Ambra Demontis, Battista Biggio, Gavin Brown, Giorgio Fumera, and Fabio Roli. Is deep learning safe for robot vision? adversarial examples against the icub humanoid. In Proceedings of the IEEE International Conference on Computer Vision Workshops, pages 751-759, 2017.

[22] Aleksander Madry, Aleksandar Makelov, Ludwig Schmidt, Dimitris Tsipras, and Adrian Vladu. Towards deep learning models resistant to adversarial attacks. arXiv preprint arXiv:1706.06083, 2017.

[23] Eric Wong and J Zico Kolter. Provable Defenses Against Adversarial Examples Via the Convex Outer Adversarial Polytope. arXiv preprint arXiv:1711.00851, 2017.

[24] Divyam Madaan and Sung Ju Hwang. Adversarial neural pruning. arXiv preprint arXiv:1908.04355, 2019.

[25] Aaditya Prakash, Nick Moran, Solomon Garber, Antonella DiLillo, and James Storer. Deflecting adversarial attacks with pixel deflection. In Proceedings of the IEEE conference on computer vision and pattern recognition, pages 8571-8580, 2018.

[26] Hongyang Zhang, Yaodong Yu, Jiantao Jiao, Eric P Xing, Laurent El Ghaoui, and Michael I Jordan. Theoretically principled trade-off between robustness and accuracy. arXiv preprint arXiv:1901.08573, 2019.

[27] Alexey Kurakin, Ian Goodfellow, and Samy Bengio. Adversarial examples in the physical world. arXiv preprint arXiv:1607.02533, 2016.

[28] Seyed-Mohsen Moosavi-Dezfooli, Alhussein Fawzi, and Pascal Frossard. Deepfool: a simple and accurate method to fool deep neural networks. In Proceedings of the IEEE conference on computer vision and pattern recognition, pages 2574-2582, 2016.

[29] Aditi Raghunathan, Jacob Steinhardt, and Percy Liang. Certified defenses against adversarial examples. arXiv preprint arXiv:1801.09344, 2018.

[30] Mahyar Fazlyab, Manfred Morari, and George J Pappas. Safety verification and robustness analysis of neural networks via quadratic constraints and semidefinite programming. arXiv preprint arXiv:1903.01287, 2019.

[31] Ian J Goodfellow, Jonathon Shlens, and Christian Szegedy. Explaining and harnessing adversarial examples. arXiv preprint arXiv:1412.6572, 2014.

[32] Kexin Pei, Yinzhi Cao, Junfeng Yang, and Suman Jana. Deepxplore: Automated whitebox testing of deep learning systems. In proceedings of the 26th Symposium on Operating Systems Principles, pages 1-18, 2017.

[33] Alesia Chernikova, Alina Oprea, Cristina Nita-Rotaru, and BaekGyu Kim. Are self-driving cars secure? evasion attacks against deep neural networks for steering angle prediction. In 2019 IEEE Security and Privacy Workshops (SPW), pages 132-137. IEEE, 2019.

[34] Dogancan Temel, Min-Hung Chen, and Ghassan AlRegib. Traffic sign detection under challenging conditions: A deeper look into performance variations and spectral characteristics. IEEE Transactions on Intelligent Transportation Systems, 2019.

[35] Aharon Ben-Tal, Laurent El Ghaoui, and Arkadi Nemirovski. Robust optimization, volume 28. Princeton University Press, 2009.

[36] Dan Hendrycks, Kevin Zhao, Steven Basart, Jacob Steinhardt, and Dawn Song. Natural adversarial examples. arXiv preprint arXiv:1907.07174, 2019.

[37] Hossein Hosseini and Radha Poovendran. Semantic adversarial examples. In Proceedings of the IEEE Conference on Computer Vision and Pattern Recognition Workshops, pages 1614-1619, 2018.

[38] Chaowei Xiao, Jun-Yan Zhu, Bo Li, Warren He, Mingyan Liu, and Dawn Song. Spatially transformed adversarial examples. arXiv preprint arXiv:1801.02612, 2018.

[39] Nikolaos Karianakis, Jingming Dong, and Stefano Soatto. An empirical evaluation of current convolutional architectures' ability to manage nuisance location and scale variability. In Proceedings of the IEEE Conference on Computer Vision and Pattern Recognition, pages 4442-4451, 2016.

[40] Mahmood Sharif, Lujo Bauer, and Michael K Reiter. On the suitability of lp-norms for creating and preventing adversarial examples. In Proceedings of the IEEE Conference on Computer Vision and Pattern Recognition Workshops, pages 1605-1613, 2018.

[41] Logan Engstrom, Brandon Tran, Dimitris Tsipras, Ludwig Schmidt, and Aleksander Madry. Exploring the landscape of spatial robustness. arXiv preprint arXiv:1712.02779, 2017.

[42] Mislav Balunovic, Maximilian Baader, Gagandeep Singh, Timon Gehr, and Martin Vechev. Certifying geometric robustness of neural networks. In Advances in Neural Information Processing Systems, pages 15287-15297, 2019.

[43] Sandesh Kamath, Amit Deshpande, and KV Subrahmanyam. Invariance vs. robustness of neural networks. arXiv preprint arXiv:2002.11318, 2020.

[44] Daniel E Worrall, Stephan J Garbin, Daniyar Turmukhambetov, and Gabriel J Brostow. Harmonic networks: Deep translation and rotation equivariance. In Proceedings of the IEEE Conference on Computer Vision and Pattern Recognition, pages 5028-5037, 2017.

[45] Carlos Esteves, Christine Allen-Blanchette, Ameesh Makadia, and Kostas Daniilidis. Learning so (3) equivariant representations with spherical cnns. In Proceedings of the European Conference on Computer Vision (ECCV), pages 52-68, 2018.

[46] Taco S Cohen, Maurice Weiler, Berkay Kicanaoglu, and Max Welling. Gauge equivariant convolutional networks and the icosahedral cnn. arXiv preprint arXiv:1902.04615, 2019.

[47] Taco Cohen and Max Welling. Group equivariant convolutional networks. In International conference on machine learning, pages 2990-2999, 2016.

[48] Nicholas Guttenberg, Nathaniel Virgo, Olaf Witkowski, Hidetoshi Aoki, and Ryota Kanai. Permutation-equivariant neural networks applied to dynamics prediction. arXiv preprint arXiv:1612.04530, 2016.

[49] Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pages 2672-2680, 2014.

[50] Jun-Yan Zhu, Richard Zhang, Deepak Pathak, Trevor Darrell, Alexei A Efros, Oliver Wang, and Eli Shechtman. Toward multimodal image-to-image translation. In Advances in neural information processing systems, pages 465-476, 2017.

[51] Zili Yi, Hao Zhang, Ping Tan, and Minglun Gong. Dualgan: Unsupervised dual learning for image-to-image translation. In Proceedings of the IEEE international conference on computer vision, pages 2849-2857, 2017.

[52] Jack Klys, Jake Snell, and Richard Zemel. Learning latent subspaces in variational autoencoders. In Advances in Neural Information Processing Systems, pages 6444-6454, 2018.

[53] Amjad Almahairi, Sai Rajeswar, Alessandro Sordoni, Philip Bachman, and Aaron Courville. Augmented cyclegan: Learning many-to-many mappings from unpaired data. arXiv preprint arXiv:1802.10151, 2018.

[54] Ming-Yu Liu, Thomas Breuel, and Jan Kautz. Unsupervised image-to-image translation networks. In Advances in neural information processing systems, pages 700-708, 2017.

[55] Yann LeCun, Corinna Cortes, and CJ Burges. Mnist handwritten digit database. ATT Labs [Online]. Available: http://yann. lecun. com/exdb/mnist, 2, 2010.

[56] Yuval Netzer, Tao Wang, Adam Coates, Alessandro Bissacco, Bo Wu, and Andrew Y Ng. Reading digits in natural images with unsupervised feature learning. NIPS Workshop on Deep Learning and Unsupervised Feature Learning, 2011.

[57] Johannes Stallkamp, Marc Schlipsing, Jan Salmen, and Christian Igel. The German Traffic Sign Recognition Benchmark: A multi-class classification competition. In IEEE International Joint Conference on Neural Networks, pages 1453-1460, 2011.

[58] Riccardo Volpi, Hongseok Namkoong, Ozan Sener, John C Duchi, Vittorio Murino, and Silvio Savarese. Generalizing to unseen domains via adversarial data augmentation. In Advances in Neural Information Processing Systems, pages 5334-5344, 2018.

[59] Diederik P Kingma and Jimmy Ba. Adam: A method for stochastic optimization. arXiv preprint arXiv:1412.6980, 2014.

[60] Matthew D Zeiler. Adadelta: an adaptive learning rate method. arXiv preprint arXiv:1212.5701, 2012.

[61] Anish Athalye, Nicholas Carlini, and David Wagner. Obfuscated gradients give a false sense of security: Circumventing defenses to adversarial examples. arXiv preprint arXiv:1802.00420, 2018.

[62] Alex Krizhevsky, Ilya Sutskever, and Geoffrey E Hinton. Imagenet classification with deep convolutional neural networks. In Advances in neural information processing systems, pages 1097-1105, 2012.

[63] Nitish Srivastava, Geoffrey Hinton, Alex Krizhevsky, Ilya Sutskever, and Ruslan Salakhutdinov. Dropout: a simple way to prevent neural networks from overfitting. The journal of machine learning research, 15(1):1929-1958, 2014.

[64] Xavier Glorot, Antoine Bordes, and Yoshua Bengio. Deep sparse rectifier neural networks. In Proceedings of the fourteenth international conference on artificial intelligence and statistics, pages 315-323, 2011.

[65] Yaroslav Ganin, Evgeniya Ustinova, Hana Ajakan, Pascal Germain, Hugo Larochelle, Frangois Laviolette, Mario Marchand, and Victor Lempitsky. Domain-adversarial training of neural networks. The Journal of Machine Learning Research, 17(1):2096-2030, 2016.

[66] Han Xiao, Kashif Rasul, and Roland Vollgraf. Fashion-mnist: a novel image dataset for benchmarking machine learning algorithms. arXiv preprint arXiv:1708.07747, 2017.

[67] Gregory Cohen, Saeed Afshar, Jonathan Tapson, and Andre Van Schaik. Emnist: Extending mnist to handwritten letters. In 2017 International Joint Conference on Neural Networks (IJCNN), pages 2921-2926. IEEE, 2017.

[68] Tarin Clanuwat, Mikel Bober-Irizar, Asanobu Kitamoto, Alex Lamb, Kazuaki Yamamoto, and David Ha. Deep learning for classical japanese literature. arXiv preprint arXiv:1812.01718, 2018.

[69] Chhavi Yadav and Leon Bottou. Cold case: The lost mnist digits. In Advances in Neural Information Processing Systems, pages 13443-13452, 2019.

[70] Jonathan J. Hull. A database for handwritten text recognition research. IEEE Transactions on pattern analysis and machine intelligence, 16(5):550-554, 1994.

[71] Yi Li and Nuno Vasconcelos. Repair: Removing representation bias by dataset resampling. In Proceedings of the IEEE Conference on Computer Vision and Pattern Recognition, pages 9572-9581, 2019.

[72] John Moody and Joachim Utans. Architecture selection strategies for neural networks: Application to corporate bond rating prediction. In Neural networks in the capital markets, pages 277-300. Citeseer, 1994.

[73] Florian Tramer, Nicholas Carlini, Wieland Brendel, and Aleksander Madry. On adaptive attacks to adversarial example defenses. arXiv preprint arXiv:2002.08347, 2020.

[74] Mahyar Fazlyab, Alexander Robey, Hamed Hassani, Manfred Morari, and George Pappas. Efficient and accurate estimation of lipschitz constants for deep neural networks. In Advances in Neural Information Processing Systems, pages 11423-11434, 2019.

[75] Moustapha Cisse, Piotr Bojanowski, Edouard Grave, Yann Dauphin, and Nicolas Usunier. Parseval networks: Improving robustness to adversarial examples. In Proceedings of the $34^{th}$ International Conference on Machine Learning-Volume 70, pages 854-863. JMLR. org, 2017.

[76] Dongyu Meng and Hao Chen. Magnet: a two-pronged defense against adversarial examples. In Proceedings of the 2017 ACM SIGSAC Conference on Computer and Communications Security, pages 135-147, 2017.

[77] Nicholas Carlini and DavidWagner. Adversarial examples are not easily detected: Bypassing ten detection methods. In Proceedings of the 10th ACM Workshop on Artificial Intelligence and Security, pages 3-14, 2017.

[78] Jiawei Su, Danilo Vasconcellos Vargas, and Kouichi Sakurai. One pixel attack for fooling deep neural networks. IEEE Transactions on Evolutionary Computation, 23(5):828-841, 2019.

[79] Yinpeng Dong, Fangzhou Liao, Tianyu Pang, Hang Su, Jun Zhu, Xiaolin Hu, and Jianguo Li. Boosting adversarial attacks with momentum. In Proceedings of the IEEE conference on computer vision and pattern recognition, pages 9185-9193, 2018.

[80] Chuan Guo, Mayank Rana, Moustapha Cisse, and Laurens Van Der Maaten. Countering adversarial images using input transformations. arXiv preprint arXiv:1711.00117, 2017.

[81] ZuxuanWu, Ser-Nam Lim, Larry Davis, and Tom Goldstein. Making an invisibility cloak: Real world adversarial attacks on object detectors. arXiv preprint arXiv:1910.14667, 2019.

[82] Can Kanbak, Seyed-Mohsen Moosavi-Dezfooli, and Pascal Frossard. Geometric robustness of deep networks: analysis and improvement. In Proceedings of the IEEE Conference on Computer Vision and Pattern Recognition, pages 4441-4449, 2018.

[83] Anish Athalye, Logan Engstrom, Andrew Ilyas, and Kevin Kwok. Synthesizing robust adversarial examples. arXiv preprint arXiv:1707.07397, 2017.

[84] Xiaolong Wang, Abhinav Shrivastava, and Abhinav Gupta. A-fast-rcnn: Hard positive generation via adversary for object detection. In Proceedings of the IEEE Conference on Computer Vision and Pattern Recognition, pages 2606-2615, 2017.

[85] Zhenyu Wu, Karthik Suresh, Priya Narayanan, Hongyu Xu, Heesung Kwon, and Zhangyang Wang. Delving into robust object detection from unmanned aerial vehicles: A deep nuisance disentanglement approach. In Proceedings of the IEEE International Conference on Computer Vision, pages 1201-1210, 2019.

[86] Chaowei Xiao, Bo Li, Jun-Yan Zhu, Warren He, Mingyan Liu, and Dawn Song. Generating adversarial examples with adversarial networks. arXiv preprint arXiv:1801.02610, 2018.

[87] Hyeungill Lee, Sungyeob Han, and Jungwoo Lee. Generative adversarial trainer: Defense to adversarial perturbations with gan. arXiv preprint arXiv:1705.03387, 2017.

[88] HuaxiaWang and Chun-Nam Yu. A direct approach to robust deep learning using adversarial networks. arXiv preprint arXiv:1905.09591, 2019.

[89] Pouya Samangouei, Maya Kabkab, and Rama Chellappa. Defense-gan: Protecting classifiers against adversarial attacks using generative models. arXiv preprint arXiv:1805.06605, 2018.

[90] Ajil Jalal, Andrew Ilyas, Constantinos Daskalakis, and Alexandros G Dimakis. The robust manifold defense: Adversarial training using generative models. arXiv preprint arXiv:1712.09196, 2017.

[91] Lukas Schott, Jonas Rauber, Matthias Bethge, and Wieland Brendel. Towards the first adversarially robust neural network model on mnist. arXiv preprint arXiv:1805.09190, 2018.

[92] Zhengli Zhao, Dheeru Dua, and Sameer Singh. Generating natural adversarial examples. arXiv preprint arXiv:1710.11342, 2017.

[93] Muhammad Muzammal Naseer, Salman H Khan, Muhammad Haris Khan, Fahad Shahbaz Khan, and Fatih Porikli. Cross-domain transferability of adversarial perturbations. In Advances in Neural Information Processing Systems, pages 12885-12895, 2019.

[94] Isaac Dunn, Tom Melham, and Daniel Kroening. Generating realistic unrestricted adversarial inputs using dual-objective gan training. arXiv preprint arXiv:1905.02463, 2019.

[95] Xiaosen Wang, Kun He, Chuan Guo, Kilian Q Weinberger, and John E Hopcroft. At-gan: A generative attack model for adversarial transferring on generative adversarial nets. arXiv preprint arXiv:1904.07793, 2019.

[96] Yang Song, Rui Shu, Nate Kushman, and Stefano Ermon. Constructing unrestricted adversarial examples with generative models. In Advances in Neural Information Processing Systems, pages 8312-8323, 2018.

[97] Simon Vandenhende, Bert De Brabandere, Davy Neven, and Luc Van Gool. A three-player gan: generating hard samples to improve classification networks. In 2019 16th International Conference on Machine Vision Applications (MVA), pages 1-6. IEEE, 2019.

[98] Vinicius F Arruda, Thiago M Paixso, Rodrigo F Berriel, Alberto F De Souza, Claudine Badue, Nicu Sebe, and Thiago Oliveira-Santos. Cross-domain car detection using unsupervised image-to-image translation: From day to night. In 2019 International Joint Conference on Neural Networks (IJCNN), pages 1-8. IEEE, 2019.

[99] Jeremy M Cohen, Elan Rosenfeld, and J Zico Kolter. Certified adversarial robustness via randomized smoothing. arXiv preprint arXiv:1902.02918, 2019.

[100] Hadi Salman, Jerry Li, Ilya Razenshteyn, Pengchuan Zhang, Huan Zhang, Sebastien Bubeck, and Greg Yang. Provably robust deep learning via adversarially trained smoothed classifiers. In Advances in Neural Information Processing Systems, pages 11289-11300, 2019.

[101] Beranger Dumont, Simona Maggio, and Pablo Montalvo. Robustness of rotation-equivariant networks to adversarial perturbations. arXiv preprint arXiv:1802.06627, 2018.

[102] Jörn-Henrik Jacobsen, Jens Behrmann, Richard Zemel, and Matthias Bethge. Excessive invariance causes adversarial vulnerability. arXiv preprint arXiv:1811.00401, 2018.

[103] Tommaso Dreossi, Somesh Jha, and Sanjit A Seshia. Semantic adversarial deep learning. In International Conference on Computer Aided Verification, pages 3-26. Springer, 2018.

[104] Lakshya Jain, Wilson Wu, Steven Chen, Uyeong Jang, Varun Chandrasekaran, Sanjit Seshia, and Somesh Jha. Generating semantic adversarial examples with differentiable rendering. arXiv preprint arXiv:1910.00727, 2019.

[105] Zhun Zhong, Liang Zheng, Guoliang Kang, Shaozi Li, and Yi Yang. Random erasing data augmentation. arXiv preprint arXiv:1708.04896, 2017.

[106] Patrick J Grother. Nist special database 19 handprinted forms and characters database. National Institute of Standards and Technology, 1995.

What is claimed is:

1. A method for model-based deep robust learning, the method comprising:
    obtaining a model of natural variation for a machine learning task, wherein the model of natural variation comprises a mapping that specifies how an input datum can be naturally varied by a nuisance parameter; and
    training, using the model of natural variation and training data for the machine learning task, a neural network to complete the machine learning task such that the neural network is robust to natural variation specified by the model of natural variation.

2. The method of claim 1, wherein obtaining the model of natural variation comprises obtaining an a priori model of natural variation.

3. The method of claim 1, wherein obtaining the model of natural variation comprises learning the model of natural variation offline using previously collected data.

4. The method of claim 1, wherein training the neural network comprises searching for at least one new data point that induces a highest loss in modeling optimization.

5. The method of claim 1, wherein training the neural network comprises randomly querying the model of natural variation to generate a plurality of new data points and selecting, from the new data points, at least one new data point that induces a highest loss in modeling optimization.

6. The method of claim 1, wherein training the neural network comprises using a gradient-based search in a nuisance space to find at least one new data point that induces a highest loss in modeling optimization.

7. The method of claim 1, wherein training the neural network comprises augmenting the training data with new data generated by the model of natural variation.

8. The method of claim 7, wherein augmenting the training data comprises randomly sampling a nuisance space to find a plurality of new data points to add to the training data.

9. The method of claim 1, wherein the machine learning task comprises a computer vision task.

10. The method of claim 9, wherein obtaining the model of natural variation comprises using a deep generative model learn the model of natural variation from a plurality of images for the computer vision task.

11. A system for model-based deep robust learning, the system comprising:

at least one processor and memory storing executable instructions for the at least one processor; and a machine learning trainer implemented on the at least one processor and configured for:

obtaining a model of natural variation for a machine learning task, wherein the model of natural variation comprises a mapping that specifies how an input datum can be naturally varied by a nuisance parameter; and training, using the model of natural variation and training data for the machine learning task, a neural network to complete the machine learning task such that the neural network is robust to natural variation specified by the model of natural variation.

12. The system of claim 11, wherein obtaining the model of natural variation comprises obtaining an a priori model of natural variation.

13. The system of claim 11, wherein obtaining the model of natural variation comprises learning the model of natural variation offline using previously collected data.

14. The system of claim 11, wherein training the neural network comprises searching for at least one new data point that induces a highest loss in modeling optimization.

15. The system of claim 11, wherein training the neural network comprises randomly querying the model of natural variation to generate a plurality of new data points and selecting, from the new data points, at least one new data point that induces a highest loss in modeling optimization.

16. The system of claim 11, wherein training the neural network comprises using a gradient-based search in a nuisance space to find at least one new data point that induces a highest loss in modeling optimization.

17. The system of claim 11, wherein training the neural network comprises augmenting the training data with new data generated by the model of natural variation.

18. The system of claim 17, wherein augmenting the training data comprises randomly sampling a nuisance space to find a plurality of new data points to add to the training data.

19. The system of claim 11, wherein the machine learning task comprises a computer vision task.

20. The system of claim 19, wherein obtaining the model of natural variation comprises using a deep generative model learn the model of natural variation from a plurality of images for the computer vision task.

21. A non-transitory computer readable medium storing executable instructions that when executed by at least one processor of a computer control the computer to perform operations comprising:

obtaining a model of natural variation for a machine learning task, wherein the model of natural variation comprises a mapping that specifies how an input datum can be naturally varied by a nuisance parameter; and training, using the model of natural variation and training data for the machine learning task, a neural network to complete the machine learning task such that the neural network is robust to natural variation specified by the model of natural variation.

* * * * *